US012163377B2

(12) United States Patent
Lundy et al.

(10) Patent No.: US 12,163,377 B2
(45) Date of Patent: Dec. 10, 2024

(54) WINDOW TREATMENT CONTROL USING BRIGHT OVERRIDE

(71) Applicant: Lutron Technology Company LLC, Coopersburg, PA (US)

(72) Inventors: Stephen Lundy, Coopersburg, PA (US); Brent Protzman, Easton, PA (US); Brian M. Courtney, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/458,187

(22) Filed: Aug. 30, 2023

(65) Prior Publication Data

US 2024/0167335 A1 May 23, 2024

Related U.S. Application Data

(60) Continuation of application No. 17/193,519, filed on Mar. 5, 2021, now Pat. No. 11,773,649, which is a (Continued)

(51) Int. Cl.
*E06B 9/68* (2006.01)

(52) U.S. Cl.
CPC ........ *E06B 9/68* (2013.01); *E06B 2009/6827* (2013.01)

(58) Field of Classification Search
CPC ............... E06B 9/68; E06B 2009/6809; E06B 2009/6818; E06B 2009/6827
See application file for complete search history.

(56) References Cited

U.S. PATENT DOCUMENTS 3,646,985 A 3/1972 Klann
4,236,101 A 11/1980 Luchaco
(Continued)

FOREIGN PATENT DOCUMENTS

CN 101245691 A 8/2008
CN 101663810 A 3/2010
(Continued)

OTHER PUBLICATIONS

First Office Action issued in connection with Chinese patent application No. 201380071795.9, Apr. 6, 2016, 6 pages.
(Continued)

*Primary Examiner* — Abe Massad
(74) *Attorney, Agent, or Firm* — Duane Morris LLP

(57) ABSTRACT

A system includes a window treatment adjacent to a window of a room. At least one motor drive unit is associated with the window treatment, for varying the position of the window treatment. A sensor measures a light level (e.g., an outdoor light level) at the window. A controller provides signals to the motor drive unit to automatically adjust the position of the window treatment so as to control a penetration distance of sunlight into the room when the window treatment is partially opened. The controller is configured to position the window treatment in a bright override position if the measured light level is at least a bright threshold value. The controller is configured to select the bright threshold value from among at least two predetermined values. The selection depends on an angle of incidence between light rays from the sun and a surface normal of the window.

21 Claims, 13 Drawing Sheets

Related U.S. Application Data continuation of application No. 15/856,324, filed on Dec. 28, 2017, now Pat. No. 10,968,697, which is a division of application No. 14/459,896, filed on Aug. 14, 2014, now Pat. No. 10,017,985.

(60) Provisional application No. 61/865,745, filed on Aug. 14, 2013.

(56) References Cited

U.S. PATENT DOCUMENTS

| | | | | |
|---|---|---|---|---|
| 4,492,908 | A | 1/1985 | Stockle et al. | |
| 4,567,557 | A | 1/1986 | Burns | |
| 4,644,990 | A | 2/1987 | Webb et al. | |
| 4,712,104 | A | 12/1987 | Kobayashi | |
| 4,841,672 | A | 6/1989 | Nebhuth et al. | |
| 4,864,201 | A | 9/1989 | Bernot | |
| 4,881,219 | A | 11/1989 | Jacquel | |
| 4,993,469 | A | 2/1991 | Moench | |
| 4,995,442 | A | 2/1991 | Marzec | |
| 5,088,645 | A | 2/1992 | Bell | |
| 5,142,133 | A | 8/1992 | Kern et al. | |
| 5,237,168 | A | 8/1993 | Giust et al. | |
| 5,237,169 | A | 8/1993 | Grehant | |
| 5,275,219 | A | 1/1994 | Giacomel | |
| 5,357,170 | A | 10/1994 | Luchaco et al. | |
| 5,391,967 | A | 2/1995 | Domel et al. | |
| 5,467,808 | A | 11/1995 | Bell | |
| 5,520,415 | A | 5/1996 | Lewis | |
| 5,532,560 | A | 7/1996 | Element et al. | |
| 5,598,000 | A | 1/1997 | Popat | |
| 5,663,621 | A | 9/1997 | Popat | |
| 5,675,487 | A | 10/1997 | Patterson et al. | |
| 5,729,103 | A | 3/1998 | Domel et al. | |
| 5,818,734 | A | 10/1998 | Albright | |
| 5,883,480 | A | 3/1999 | Domel et al. | |
| 6,064,949 | A | 5/2000 | Werner et al. | |
| 6,069,465 | A | 5/2000 | de Boois et al. | |
| 6,084,231 | A | 7/2000 | Popat | |
| 6,100,659 | A | 8/2000 | Will et al. | |
| 6,263,260 | B1 | 7/2001 | Bodmer et al. | |
| 6,307,331 | B1 | 10/2001 | Bonasia et al. | |
| 6,528,957 | B1 | 3/2003 | Luchaco | |
| 6,674,255 | B2 | 1/2004 | Schnebly et al. | |
| 6,759,643 | B2 | 7/2004 | Su et al. | |
| 6,983,783 | B2 * | 1/2006 | Carmen, Jr. | H05B 47/17<br>160/176.1 P |
| 7,085,627 | B2 | 8/2006 | Bamberger et al. | |
| 7,111,952 | B2 | 9/2006 | Veskovic | |
| 7,155,296 | B2 | 12/2006 | Klasson et al. | |
| 7,193,201 | B2 | 3/2007 | Motte | |
| 7,369,060 | B2 | 5/2008 | Veskovic et al. | |
| 7,389,806 | B2 | 6/2008 | Kates | |
| 7,391,297 | B2 | 6/2008 | Cash et al. | |
| 7,417,397 | B2 | 8/2008 | Berman et al. | |
| 7,445,035 | B2 | 11/2008 | Bruno et al. | |
| 7,468,591 | B2 | 12/2008 | Bruno | |
| 7,566,137 | B2 | 7/2009 | Veskovic | |
| 7,588,067 | B2 | 9/2009 | Veskovic | |
| 7,737,653 | B2 | 6/2010 | Carmen, Jr. et al. | |
| 7,839,109 | B2 | 11/2010 | Carmen, Jr. et al. | |
| 7,950,827 | B2 | 5/2011 | Veskovic | |
| 7,963,675 | B2 | 6/2011 | Veskovic | |
| 7,977,904 | B2 | 7/2011 | Berman et al. | |
| 8,120,292 | B2 | 2/2012 | Berman et al. | |
| 8,125,172 | B2 | 2/2012 | Berman et al. | |
| 8,165,719 | B2 | 4/2012 | Kinney et al. | |
| 8,165,720 | B2 | 4/2012 | Ma | |
| 8,197,093 | B2 | 6/2012 | Veskovic | |
| 8,219,217 | B2 | 7/2012 | Bechtel et al. | |
| 8,288,981 | B2 | 10/2012 | Zaharchuk et al. | |
| 8,380,393 | B1 | 2/2013 | Ohtomo | |
| 8,417,388 | B2 | 4/2013 | Altonen et al. | |
| 8,432,117 | B2 | 4/2013 | Berman et al. | |
| 8,456,729 | B2 | 6/2013 | Brown et al. | |
| 8,508,169 | B2 | 8/2013 | Zaharchuk et al. | |
| 8,525,462 | B2 | 9/2013 | Berman et al. | |
| 8,571,719 | B2 | 10/2013 | Altonen et al. | |
| 8,581,163 | B2 | 11/2013 | Grehant et al. | |
| 8,587,242 | B2 | 11/2013 | Berman et al. | |
| 8,624,529 | B2 | 1/2014 | Neuman | |
| 8,666,555 | B2 | 3/2014 | Altonen et al. | |
| 8,688,330 | B2 | 4/2014 | Werner et al. | |
| 8,723,466 | B2 | 5/2014 | Chambers et al. | |
| 8,723,467 | B2 | 5/2014 | Berman et al. | |
| 8,779,905 | B2 | 7/2014 | Courtney et al. | |
| 8,786,236 | B2 | 7/2014 | Zaharchuk et al. | |
| 8,836,263 | B2 | 9/2014 | Berman et al. | |
| 8,866,343 | B2 | 10/2014 | Abraham et al. | |
| 8,890,456 | B2 | 11/2014 | Berman et al. | |
| 8,901,769 | B2 | 12/2014 | Altonen et al. | |
| 8,950,461 | B2 | 2/2015 | Adams et al. | |
| 8,975,778 | B2 | 3/2015 | Altonen et al. | |
| 9,006,642 | B2 | 4/2015 | Wang et al. | |
| 9,013,059 | B2 | 4/2015 | Altonen et al. | |
| 9,447,635 | B2 | 9/2016 | Derk | |
| 9,650,831 | B2 | 5/2017 | Birru et al. | |
| 9,752,383 | B2 | 9/2017 | Lundy et al. | |
| 9,933,761 | B2 | 4/2018 | Courtney et al. | |
| 9,985,436 | B2 * | 5/2018 | Courtney | G06F 9/30189 |
| 10,017,985 | B2 | 7/2018 | Lundy et al. | |
| 10,139,791 | B2 | 11/2018 | Lundy et al. | |
| 10,167,667 | B2 | 1/2019 | Patel | |
| 10,802,372 | B2 * | 10/2020 | Brown | G05B 19/048 |
| 10,968,697 | B2 | 4/2021 | Lundy et al. | |
| 2001/0027846 | A1 | 10/2001 | Osinga | |
| 2002/0093297 | A1 | 7/2002 | Schnebly et al. | |
| 2003/0040813 | A1 | 2/2003 | Gonzales et al. | |
| 2003/0098133 | A1 | 5/2003 | Palmer | |
| 2003/0159355 | A1 | 8/2003 | Froerer et al. | |
| 2003/0188836 | A1 | 10/2003 | Whiting | |
| 2004/0225379 | A1 | 11/2004 | Klasson et al. | |
| 2005/0110416 | A1 | 5/2005 | Veskovic | |
| 2005/0119792 | A1 | 6/2005 | Maistre et al. | |
| 2005/0131554 | A1 | 6/2005 | Bamberger et al. | |
| 2006/0185799 | A1 | 8/2006 | Kates | |
| 2006/0207730 | A1 | 9/2006 | Berman et al. | |
| 2008/0088180 | A1 | 4/2008 | Cash et al. | |
| 2008/0092075 | A1 | 4/2008 | Jacob et al. | |
| 2008/0183316 | A1 | 7/2008 | Clayton | |
| 2008/0236763 | A1 | 10/2008 | Kates | |
| 2009/0020233 | A1 * | 1/2009 | Berman | E06B 9/56<br>318/446 |
| 2009/0222137 | A1 | 9/2009 | Berman et al. | |
| 2009/0254222 | A1 | 10/2009 | Berman et al. | |
| 2009/0301672 | A1 | 12/2009 | Veskovic | |
| 2009/0308543 | A1 | 12/2009 | Kates | |
| 2010/0071856 | A1 | 3/2010 | Zaharchuk et al. | |
| 2011/0029139 | A1 | 2/2011 | Altonen et al. | |
| 2011/0035061 | A1 | 2/2011 | Altonen et al. | |
| 2011/0164304 | A1 | 7/2011 | Brown et al. | |
| 2011/0220299 | A1 | 9/2011 | Berman et al. | |
| 2012/0053731 | A1 | 3/2012 | Feldstein et al. | |
| 2012/0073765 | A1 | 3/2012 | Hontz | |
| 2012/0133315 | A1 | 5/2012 | Berman et al. | |
| 2012/0299486 | A1 | 11/2012 | Birru | |
| 2013/0057937 | A1 | 3/2013 | Berman et al. | |
| 2013/0263510 | A1 | 10/2013 | Gassion | |
| 2013/0276371 | A1 | 10/2013 | Birru | |
| 2014/0090787 | A1 | 4/2014 | Colson et al. | |
| 2014/0145511 | A1 | 5/2014 | Renzi et al. | |
| 2014/0156079 | A1 | 6/2014 | Courtney et al. | |
| 2014/0163742 | A1 | 6/2014 | Element | |
| 2014/0262057 | A1 | 9/2014 | Chambers et al. | |
| 2014/0265863 | A1 | 9/2014 | Gajurel et al. | |
| 2014/0318716 | A1 | 10/2014 | Patel | |
| 2014/0318717 | A1 | 10/2014 | Patel | |
| 2014/0345807 | A1 | 11/2014 | Derk | |
| 2015/0129140 | A1 | 5/2015 | Dean et al. | |
| 2015/0177709 | A1 | 6/2015 | Gill | |
| 2015/0184459 | A1 | 7/2015 | Wang et al. | |
| 2015/0191971 | A1 | 7/2015 | Cavarec | |
| 2015/0295411 | A1 | 10/2015 | Courtney et al. | |
| 2015/0368967 | A1 | 12/2015 | Lundy et al. | |

(56) References Cited

U.S. PATENT DOCUMENTS

| | | | |
|---|---|---|---|
| 2016/0040478 | A1 | 2/2016 | Lundy et al. |
| 2016/0047164 | A1 | 2/2016 | Lundy et al. |
| 2017/0234068 | A1 | 8/2017 | Gill |
| 2018/0119488 | A1 | 5/2018 | Lundy et al. |
| 2018/0120798 | A1 | 5/2018 | Courtney et al. |
| 2018/0252035 | A1 | 9/2018 | Casey et al. |
| 2019/0384232 | A1 | 12/2019 | Casey et al. |

FOREIGN PATENT DOCUMENTS

| | | | |
|---|---|---|---|
| CN | 102598867 | A | 7/2012 |
| DE | 19607716 | A1 | 9/1997 |
| DE | 10253507 | A1 | 5/2004 |
| EP | 0771929 | A1 | 5/1997 |
| EP | 0844361 | A1 | 5/1998 |
| FR | 2544887 | A1 | 4/1983 |
| JP | 01105896 | A | 4/1989 |
| JP | H0291348 | A | 3/1990 |
| JP | 6280460 | A | 10/1994 |
| JP | 08004452 | A | 9/1996 |
| JP | H09158636 | A | 6/1997 |
| JP | 10072985 | A | 3/1998 |
| JP | 200054762 | A | 2/2000 |
| JP | 200096956 | A | 4/2000 |
| WO | 9615650 | A1 | 5/1996 |
| WO | 03098125 | A1 | 11/2003 |
| WO | 2012080589 | A1 | 6/2012 |
| WO | 2013112255 | A1 | 8/2013 |

OTHER PUBLICATIONS

International Search Report and Written Opinion issued Jul. 1, 2014, in PCT application No. PCT/US2014/022412.

Copy of International Search Report/Written Opinion issued Nov. 13, 2014 in counterpart PCT application No. PCT/US2014/051059.

International Search Report and Written Opinion dated Oct. 7, 2014 of corresponding application PCT/US2013/071642.

Lee, E.S. et al., "Low-cost Networking for Dynamic Window Systems". Submitted Oct. 2, 2003, accepted Dec. 19, 2003 and published in Energy and Buildings 36 (2004) 503-513. LBNL-52198.

Lee E.S. et al., "Integrated Performance of an Automated Venetian Blind/Electric Lighting System in a Full-Scale Private Office", Proceedings of the ASHRAE/DOE/BTECC Conference, Thermal Performance of the Exterior Envelopes of Buildings VII, Clearwater Beach, Florida, Dec. 7-11, 1998.

* cited by examiner 104
174
203
202

WINDOW TREATMENT CONTROL USING BRIGHT OVERRIDE

This application is a continuation of U.S. patent application Ser. No. 17/193,519, filed Mar. 5, 2021, entitled “Window Treatment Control Using Bright Override,” which is a continuation of U.S. patent application Ser. No. 15/856,324, filed Dec. 28, 2017, now U.S. Pat. No. 10,968,697 entitled “Window Treatment Control Using Bright Override,” which is a division of U.S. patent application Ser. No. 14/459,896, filed Aug. 14, 2014, now U.S. Pat. No. 10,017,985, entitled “Window Treatment Control Using Bright Override,” which claims the benefit of U.S. Provisional Patent Application Ser. No. 61/865,745, filed Aug. 14, 2013, each of which is expressly incorporated by reference herein in its entirety.

FIELD

This disclosure relates generally to control systems, and more specifically to automated controls for motorized window treatments.

BACKGROUND

Automated window treatment control systems provide commands to motor drive units, which actuate window treatments, such as roller shades. U.S. Pat. No. 8,288,981 (the ’981 patent) is incorporated by reference herein in its entirety. The ’981 patent describes an automated window treatment control system which uses date, time, location and façade orientation information to automatically adjust shade positions to limit the penetration depth of direct sunlight into a room. The system described in the ’981 patent can be operated independently of the weather, and does not require information regarding dynamic changes to the lighting environment, due to shadows or clouds.

Light sensors, such as window sensors, can enhance the performance of window treatment control systems by working at the window level to communicate current exterior light conditions to the automated window treatment management system. The addition of light sensors enables the system to respond appropriately, improve occupant comfort, and enhance the system’s energy saving potential. The sensor provides the light management system with information to improve natural daylight, available views, and occupant comfort when shadows are cast on buildings as well as when cloudy or bright sunny weather conditions prevail.

SUMMARY

In some embodiments, a system comprises a motorized window treatment positioned adjacent to a window of a room. The motorized window treatment includes a motor drive unit for varying a position of the window treatment. A sensor is provided for measuring a light level (e.g., an outdoor light level) at the window. A controller is configured to provide signals to the motor drive unit to automatically adjust the position of the window treatment so as to control a penetration distance of sunlight into the room when the window treatment is partially opened. The controller is configured to adjust the position of the window treatment to a bright override position if the measured outdoor light level is at least (e.g., greater than or equal to) a bright threshold value. The controller is configured to select the bright threshold value from among at least two predetermined values. The selection depends on an angle of incidence between light rays from the sun and a surface normal of the window.

In some embodiments, a system comprises a window treatment positioned adjacent to a window of a room and having a motor drive unit for varying a position of the window treatment. A sensor is provided for measuring a light level (e.g., an outdoor light level) at the window. A controller is configured for providing signals to the motor drive unit to automatically adjust the position of the window treatment so as to control a penetration distance of sunlight into the room when the window treatment is partially opened. The controller is configured to adjust the position of the window treatment to a bright override position if the measured outdoor light level is greater than or equal to a bright threshold value. The controller is configured to dynamically determine the bright threshold value based on an altitude angle of the sun and an incident angle between rays from the sun and a surface normal of the window.

In some embodiments, a controller is configured for providing signals to a motor drive unit to automatically adjust a position of a window treatment adjacent a window, so as to control a penetration distance of sunlight into a room when the window treatment is partially opened. The controller is configured to adjust the position of the window treatment to a bright override position if a measured light level is greater than or equal to a bright threshold value. The controller is configured to select the bright threshold value from among at least two predetermined values, the selection depending on an angle of incidence between light rays from the sun and a surface normal of the window.

In some embodiments, a method comprises automatically providing signals to a motor drive unit to automatically adjust a position of a window treatment adjacent a window, so as to control a penetration distance of sunlight into a room when the window treatment is partially opened. The position of the motorized window treatment is automatically adjusted to a bright override position if a measured light level is greater than or equal to a bright threshold value. The bright threshold value is automatically selected from among at least two predetermined values. The selection depends on an angle of incidence between light rays from the sun and a surface normal of the window.

In some embodiments, a non-transitory machine-readable storage medium is encoded with program instructions, such that, when the program instructions are executed by a controller, the controller performs a method comprising automatically providing signals to a motor drive unit to automatically adjust a position of a window treatment adjacent a window, so as to control a penetration distance of sunlight into a room when the window treatment is partially opened; automatically adjusting the position of the window treatment to a bright override position if a measured light level is greater than or equal to a bright threshold value, and automatically selecting the bright threshold value from among at least two predetermined values, the selection depending on an angle of incidence between light rays from the sun and a surface normal of the window.

DETAILED DESCRIPTION

Figure 1A:
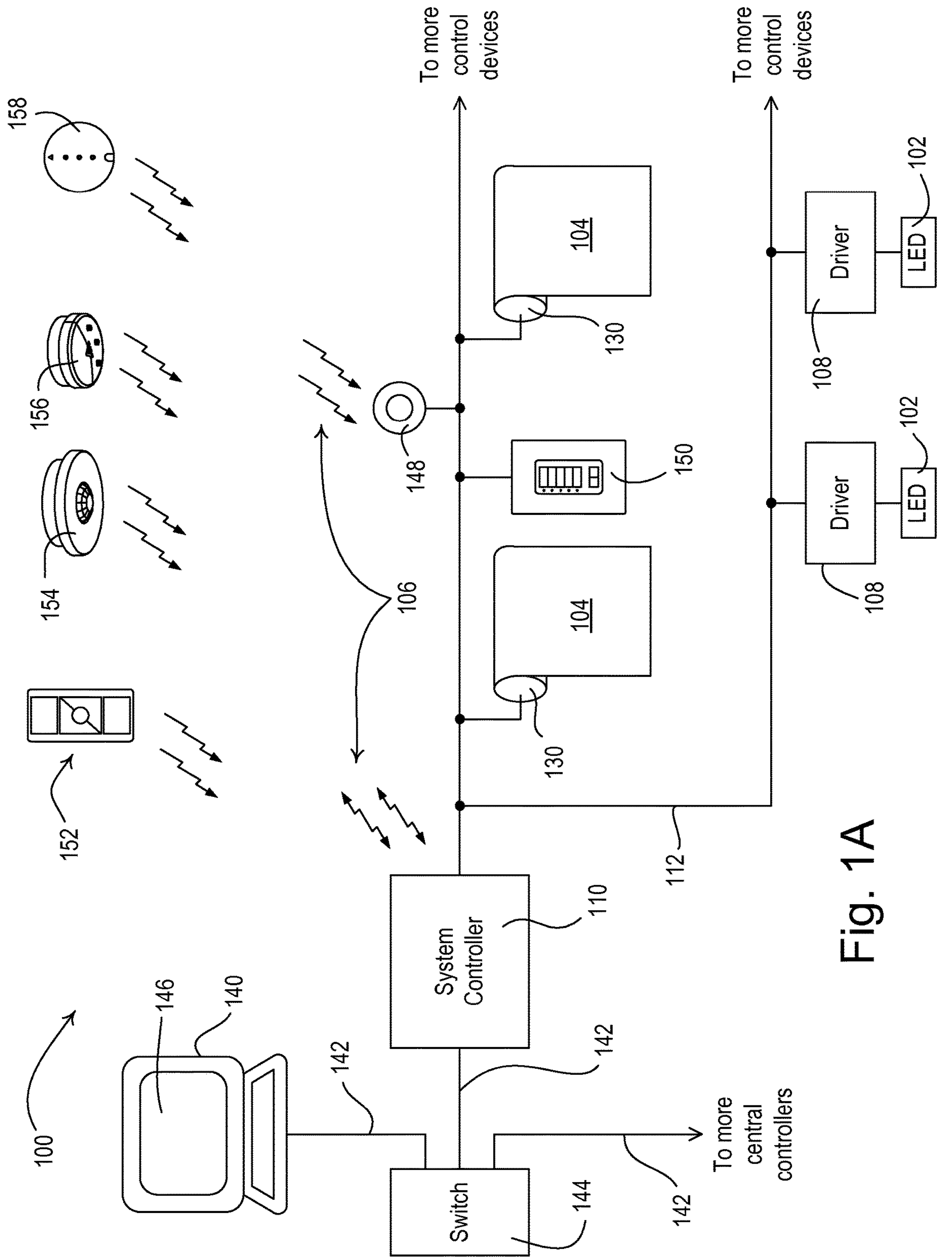
FIG. 1A is a block diagram of an embodiment of a lighting and window treatment control system.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In the discussion below, reference is made to the position of the sun with respect to a building. One of ordinary skill understands that these references to the position of the sun are in a coordinate system centered at the location of the system described herein; and that the apparent change in position of the sun is due to rotation of the earth about its axis and revolution of the earth around the sun.

FIG. 1 is a simplified block diagram of an example load control system 100. The load control system 100 is operable to control the level of illumination in a space by controlling the intensity level of the electrical lights in the space and the daylight entering the space. As shown in FIG. 1, the load control system 100 is operable to control the amount of power delivered to (and thus the intensity of) a plurality of lighting loads, e.g., a plurality of light-emitting diode (LED) light sources 102. The load control system 100 is further operable to control the position of a plurality of motorized window treatments, e.g., motorized roller shades 104, to control the amount of sunlight entering the space. The motorized window treatments could alternatively comprise motorized draperies, blinds, or roman shades.

The load control system 100 may comprise a system controller 110 (e.g., a central controller or load controller) operable to transmit and receive digital messages via both wired and wireless communication links. For example, the system controller 110 may be coupled to one or more wired control devices via a wired digital communication link 104. In addition, the system controller 110 may be configured to transmit and receive wireless signals, e.g., radio-frequency (RF) signals 106, to communicate with one or more wireless control devices.

Each of the LED light sources 102 is coupled to one of a plurality of LED drivers 108 for control of the intensities of the LED light sources. The drivers 108 are operable to receive digital messages from the system controller 110 via a digital communication link 112 and to control the respective LED light sources 132 in response to the received digital messages. Alternatively, the LED drivers 108 could be coupled to a separate digital communication link, such as an Ecosystem® or digital addressable lighting interface (DALI) communication link, and the load control system 100 could further comprise a digital lighting controller coupled between the communication link 112 and the separate communication link. The load control system 100 may further comprise other types of remotely-located load control devices, such as, for example, electronic dimming ballasts for driving fluorescent lamps.

Each motorized roller shade 104 may comprise a motor drive unit (MDU) 130. In some embodiments, each roller shade has a corresponding motor drive unit 130 located inside a roller tube of the associated roller shade 104. In other embodiments (e.g., as discussed below in the description of FIGS. 2A-3B, the system has a plurality of groups, and each group has a single MDU 130 capable of actuating all of the roller shades 104 in that group. The motor drive units 130 are responsive to digital messages received via the digital communication link 112. For example, the motor drive units 130 may be configured to adjust the position of a window treatment fabric in response to digital messages received from the system controller 110 via the digital communication link 112. Alternatively, each motor drive unit 130 could comprise an internal RF communication circuit or be coupled to an external RF communication circuit (e.g., located outside of the roller tube) for transmitting and/or receiving the RF signals 106. In addition, the load control system 100 could comprise other types of daylight control devices, such as, for example, a cellular shade, a drapery, a Roman shade, a Venetian blind, a Persian blind, a pleated blind, a tensioned roller shade systems, an electrochromic or smart window, or other suitable daylight control device.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The system controller 110 manages the operation of the load control devices (i.e., the drivers 108 and the motor drive units 130) of the load control system 100. In some embodiments, the system controller 110 is operable to be coupled to a processor 140 (e.g., a personal computer (PC), laptop, mobile device or other device having an embedded processor) via an Ethernet link 142 and a standard Ethernet switch 144, such that the PC is operable to transmit digital messages to the drivers 108 and the motor drive units 130 via the system controller 110. The PC 140 (or other processor) executes a graphical user interface (GUI) software, which is displayed on a PC screen 146. The GUI software allows the user to configure and monitor the operation of the load control system 100. During configuration of the load control system 100, the user is operable to determine how many drivers 108, motor drive units 130, and system controllers 110 that are connected and active using the GUI software. Further, the user may also assign one or more of the drivers 108 to a zone or a group, such that the drivers 108 in the group respond together to, for example, an actuation of a wall station.

Although FIG. 1 shows that the processor is a PC with a direct Ethernet connection, other devices can be used to control the system controller 110 by way of a wireless access point (or gateway) 148, which can be connected to the digital communication link 112. For example, in some embodiments, the wireless access point 148 is a QS module sold by Lutron Electronics Co., Inc. of Coopersburg, PA. The wireless access point 148 is capable of communicating with (e.g., receiving the RF signals 106 from) a plurality of wireless devices, such as but not limited to, light sensors, occupancy sensors, wireless remote control devices, or mobile devices with suitable applications for communicating with the hum 140. The wireless access point 148 may be configured to transmit a digital message to the system controller 110 via the digital communication link 112 in response to a digital message received from one of the wireless control devices via the RF signals 106. For example, the wireless access point 148 may simply re-transmit the digital messages received from the wireless control devices on the digital communication link 112.

The load control system 100 may comprise one or more input devices, such as a wired keypad device 150, a battery-powered remote control device 152, an occupancy sensor 154, a daylight sensor 156, or a window sensor 158 (e.g., a shadow sensor or a cloudy-day sensor). The wired keypad device 150 may be configured to transmit digital messages to the system controller 110 via the digital communication link 104 in response to an actuation of one or more buttons of the wired keypad device. The battery-powered remote control device 152, the occupancy sensor 154, and the daylight sensor 156 may be wireless control devices (e.g., RF transmitters) configured to transmit digital messages to the system controller 110 via the RF signals 106 transmitted directly to the system controller 110 or transmitted via the wireless access point 148. For example, the battery-powered remote control device 152 may be configured to transmit digital messages to the system controller 110 via the RF signals 106 in response to an actuation of one or more buttons of the battery-powered remote control device. The system controller 110 may be configured to transmit one or more digital messages to the load control devices (e.g., the drivers 108 and/or the motor drive units 130) in response to the digital messages received from the wired keypad device 150, the battery-powered remote control device 152, the occupancy sensor 154, the daylight sensor 156, and/or the window sensor 158.

The occupancy sensor 154 may be configured to detect occupancy and vacancy conditions in the space in which the load control system 100 is installed. The occupancy sensor 154 may transmit digital messages to the system controller 110 via the RF signals 106 in response to detecting the occupancy or vacancy conditions. In some embodiments, the system controller 110 modifies the bright threshold based on occupancy for advanced solar gain control, to provide different bright override thresholds for an occupied space and a vacant space. For example, the bright threshold in a vacant space can be higher than the bright threshold used for an occupied space. In some embodiments, the system controller 110 may each be configured to turn one or more of the LED light sources 102 on and off in response to receiving an occupied command and a vacant command, respectively. Alternatively, the occupancy sensor 154 may operate as a vacancy sensor, such that the lighting loads are only turned off in response to detecting a vacancy condition (e.g., not turned on in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 156 may be configured to measure a total light intensity in the space in which the load control system is installed. The daylight sensor 156 may transmit digital messages including the measured light intensity to the system controller 110 via the RF signals 106 for controlling the intensities of one or more of the LED light sources 132 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The window sensor 158 may be configured to measure a light intensity from outside the building in which the load control system 100 is installed (e.g., an outdoor light level). The window sensor 158 may transmit digital messages including the measured light intensity from outside the building to the system controller 110 via the RF signals 106 for controlling the motorized roller shades 104 in response to the measured light intensity. For example, the window sensor 158 may detect when direct sunlight is directly shining into the window sensor, is reflected onto the window sensor, or is blocked by external means, such as clouds or a building, and may send a message indicating the measured light level. The window sensor 158 may be installed at a window level to communicate current exterior light conditions.

In some embodiments, the system controller 110 executes a program for determining a respective window treatment position for its respective group of windows, to limit the penetration distance of direct sunlight into the respective rooms associated with those windows to a maximum penetration distance. U.S. Pat. No. 8,288,981 (the '981 patent) describes an automated window treatment control system which uses date, time, location and façade orientation information to automatically adjust shade positions to limit the penetration distance of direct sunlight into a room to a maximum penetration distance. Occupants standing or seated further from the window than the penetration distance will not have a direct line of sight to the sun below the hem bar of the shade, even if they look directly at the shade. The '981 patent is incorporated by reference herein in its entirety.

The system controller 110 is operable to transmit digital messages to the motorized roller shades 104 to control the amount of sunlight entering a space 160 of a building (FIG. 2A-3B) to control a sunlight penetration distance $d_{PEN}$ in the space. The system controller 110 comprises an astronomical timeclock and is able to determine a sunrise time and a sunset time for each day of the year for a specific location. The system controller 110 transmits commands to the motor drive units 130 to automatically control the motorized roller shades 104 in response to a timeclock schedule. Alternatively, the PC 140 could comprise the astronomical timeclock and could transmit the digital messages to the motorized roller shades 104 to control the sunlight penetration distance $d_{PEN}$ in the space 160.

Details of an algorithm for controlling the penetration distance $d_{PEN}$ are provided in U.S. Pat. No. 8,288,981, which is incorporated by reference herein in its entirety.

Figure 1B:
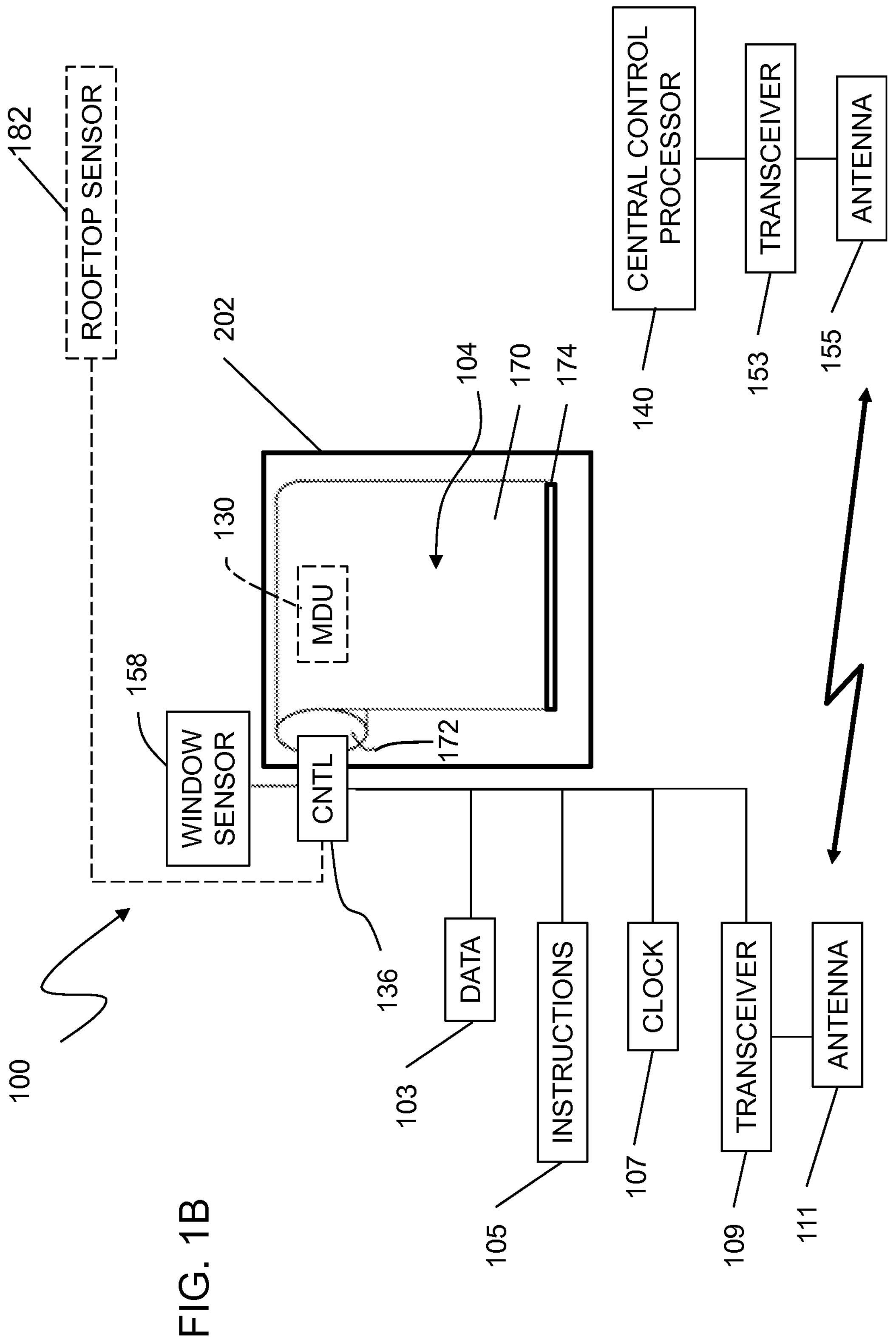
FIG. 1B is a detailed block diagram of one of the motor drive units of FIG. 1A, and its control environment.

FIG. 1B is a detailed block diagram of a motorized window treatment, e.g., one of the motorized roller shades 104, and its control environment. The motorized roller shade 104 is positioned adjacent to a window 202 (FIG. 2) or skylight of a room. The example in FIG. 1B includes a roller shade, but in various other embodiments, the motorized window treatment can comprise motorized draperies, blinds, roman shades, or skylight shades; and any desired number of motorized window treatments 104 can be included.

The motorized roller shade 104 includes the motor drive unit (MDU) 130, which may be located, for example, inside a roller tube 172 of the roller shade. Each motor drive unit 130 includes an AC or DC motor, and is directly or indirectly coupled to a control circuit 136 for receiving signals from the respective control circuit. In some embodiments, the motor of the motor drive unit 130 is associated with, and capable of actuating, one or more motorized roller shades 104, for varying a position of a window covering e.g., a shade fabric 170. The control circuit 136 can include a microcontroller, embedded processor, or an application specific integrated circuit. The control circuit 136 has at least one wired and/or wireless communication link to at least one sensor 158 and/or 182. In some embodiments, the sensor is a window sensor 158 for detecting solar radiation received by a particular face of the building. In some embodiments, the sensor is a rooftop sensor 182 for sensing solar radiation on a horizontal rooftop surface. In some settings, a rooftop sensor 182 can provide a measurement of solar radiation that is free of shadows from neighboring buildings.

In some embodiments, the control circuit 136 receives instructions from the system controller 110 detailing the desired shade position at a given time.

In some embodiments, the control circuit 136, instructions 105 and data 103 for controlling the operation of the motorized roller shade 104 are all locally contained in or on the housing of the motor drive unit 130. For example, the system 100 contains data 103, computer program instructions 105, and its own system clock 107 as well as a communications interface. In various embodiments, the communications interface may contain any one or more of an RF transceiver 109 and an antenna 111, a WiFi (IEEE 802.11) interface, a Bluetooth interface, or the like. In other embodiments, the control circuit 136 has a wired communications interface, such as X10 or Ethernet. A self-contained system 100 as shown can operate independently, without receiving instructions from an external processor. In some embodiments, the control circuit 136 is configured to operate independently, but is also responsive to manual overrides or commands received from an external processor.

In some embodiments, the control circuit 136 is further coupled to one or more additional motorized roller shades 104, and/or a central control processor 151 (e.g., the system controller 110 of the load control system 100). For example, in some embodiments, the control circuit 136 is connected to the transceiver 109 and the antenna 111 for transmitting and receiving radio-frequency (RF) signals to/from the central control processor 151, which can be configured with its own transceiver 153 and antenna 155. The control circuit 136 is responsive to the received signals for controlling the motor drive units 130 for controlling the motorized roller shades.

In other embodiments, the control circuit 136 receives program commands from the central control processor 151, and reports sensor data and window treatment position to the central control processor. The application logic for determining how to operate the system resides in the central processor 151. In some embodiments, the central control processor 151 is located in the same room as the motorized roller shade 104. In other embodiments, the central control processor 151 is located in a different room from the motorized roller shade 104. Thus, the system can include a variety of configurations of distributed processors.

Figure 2B:
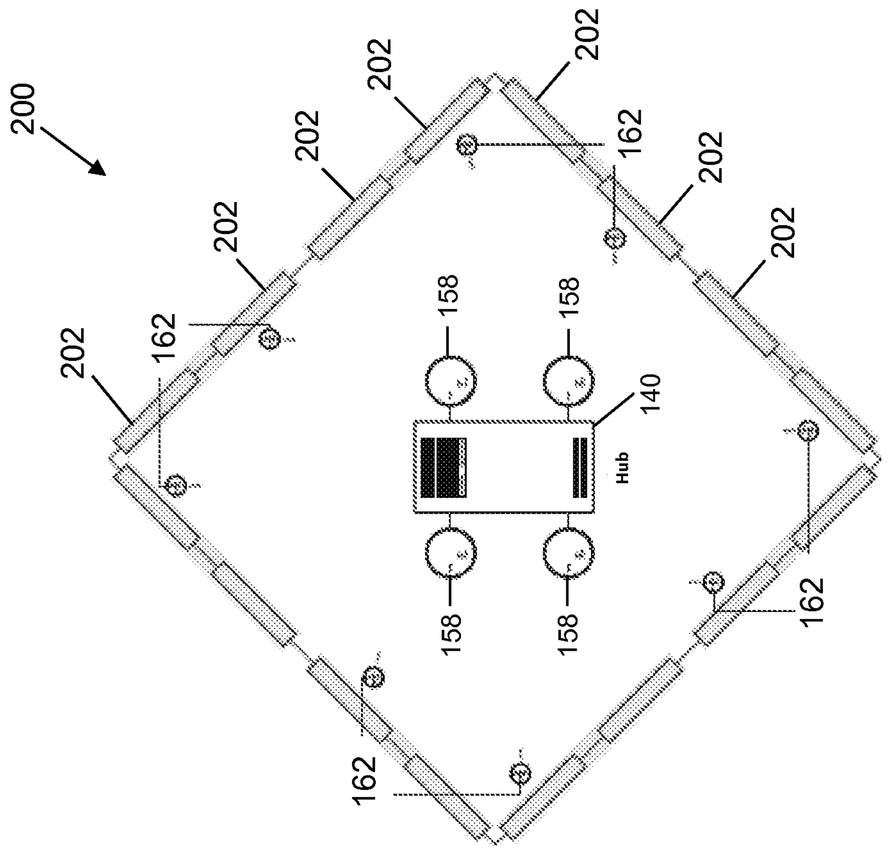
FIGS. 2A and 2B are perspective and floor plan views of a building and floor, respectively, in which the system is installed.
Figure 2A:
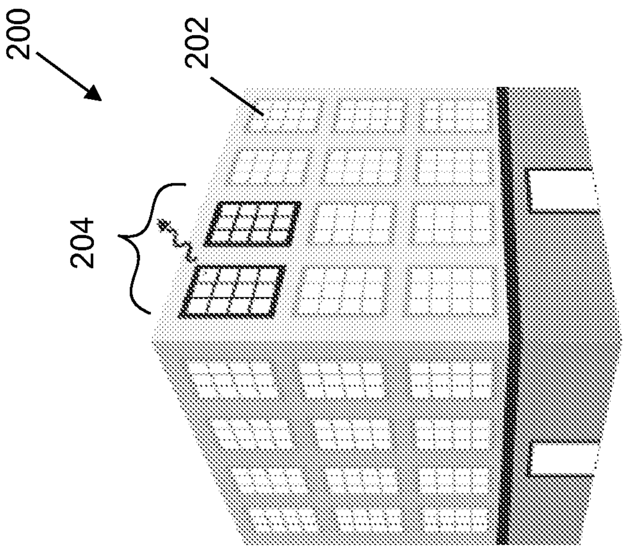

FIG. 2A is a perspective view of a building 200 having a control system 100 for controlling a plurality of motorized roller shades 104. The building has a plurality of windows 202, which are divided into window treatment groups 204 (also referred to below as groups for brevity). Each window treatment group 204 includes one or more motorized roller shades 104 to be operated together. That is, each opening command and each closing command applied to one of the motorized roller shades 104 in the window treatment group is applied to all of the shades in the same window treatment group. If some or all of the groups include two or more motorized roller shades 104, hardware, installation and maintenance costs can be reduced. For example, all of the motorized roller shades 104 in a group can be associated with a single window sensor 158, a single control circuit 136, a single wireless access point (or gateway) 148 and a single system controller 110.

FIG. 2B is a plan view of one floor of the building 200. In the configuration of FIG. 2B, each floor has a respective system controller 110. The windows 202 on each façade are divided into groups of two. Each group of two windows 202 has a respective window sensor 158. In some embodiments, the window sensor 158 is a wireless "RADIO SHADOW SENSOR" sold by Lutron Electronics Co., Inc. of Coopersburg, PA. In some embodiments, wired window sensors are used. In other embodiments, other window or light sensors are used.

The system includes a respective wireless access point (or gateway) 148 for each respective side of the building 200. The wireless access point 148 provides communications for each respective window sensor 158 on its respective side of the building 200.

Figure 3B:
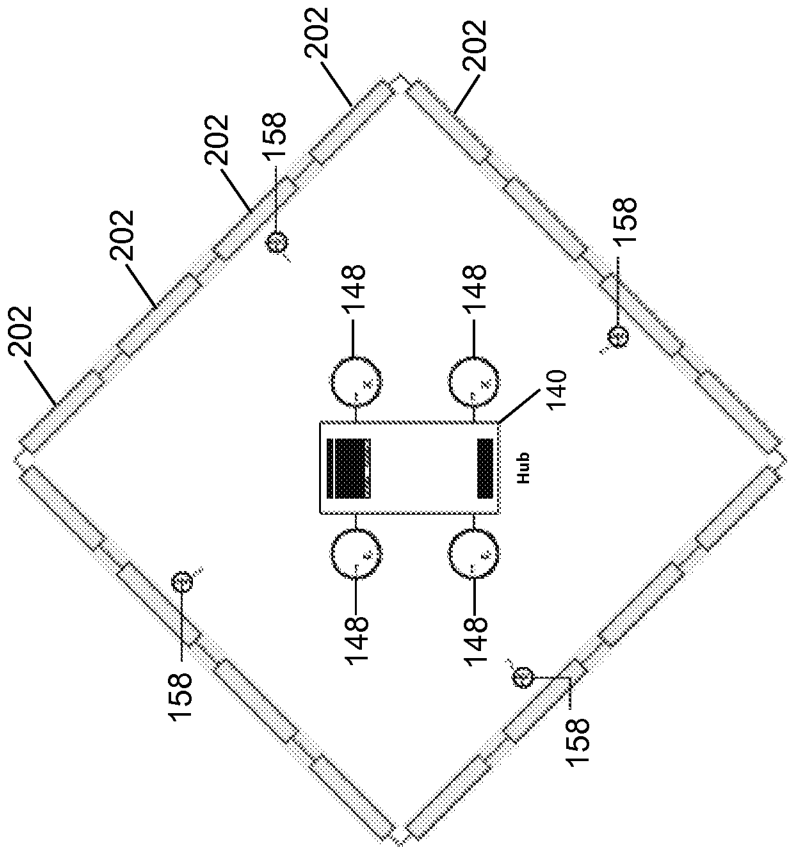
FIGS. 3A and 3B are perspective and floor plan views of the building of FIGS. 2A and 2B, with a different grouping of windows for control.
Figure 3A:
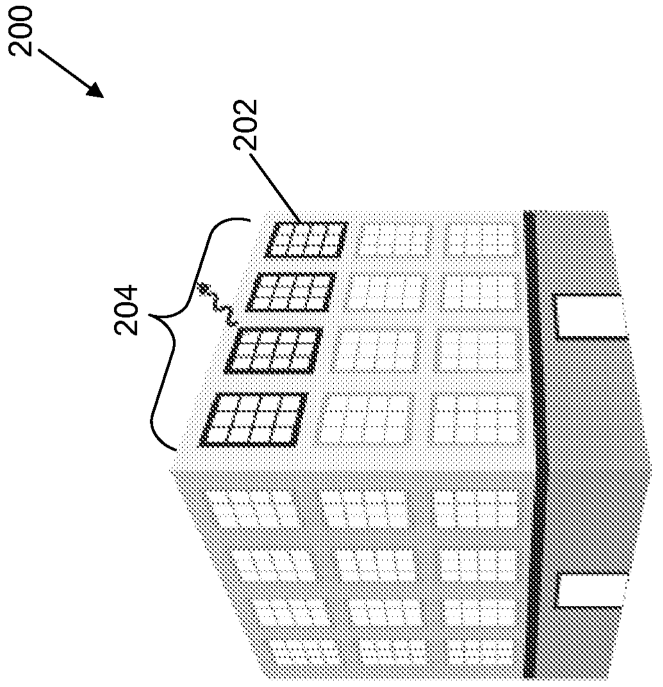

FIGS. 3A and 3B show another control arrangement for the same building shown in FIG. 2A. In FIGS. 3A and 3B, each group 204 includes four windows 202. FIG. 3B is a plan view of one floor of the building 200. In the configuration of FIG. 3B, each floor has a respective system controller 110. The windows 202 on each façade are divided by floor, with one group per façade, per floor. Each group of four windows 202 has a respective window sensor 158.

The number of groups in a given floor depends on cost factors, and on the exterior lighting environment of the building. For a building surrounded by open space, all windows have the same unobstructed view of the sun, and a single group with one window sensor per floor per façade may be satisfactory to provide occupant comfort. If some of the windows face trees or buildings, while others have a clear line of sight to the sun, the windows facing trees or buildings can be assigned to a first group, and the windows having a clear line of sight can be assigned to a second group. These are only examples, and any desired number of groups can be assigned on any floor, and on any façade. Further, the number of groups and the number of windows per group can be varied among floors and/or varied among facades.

Figure 4:
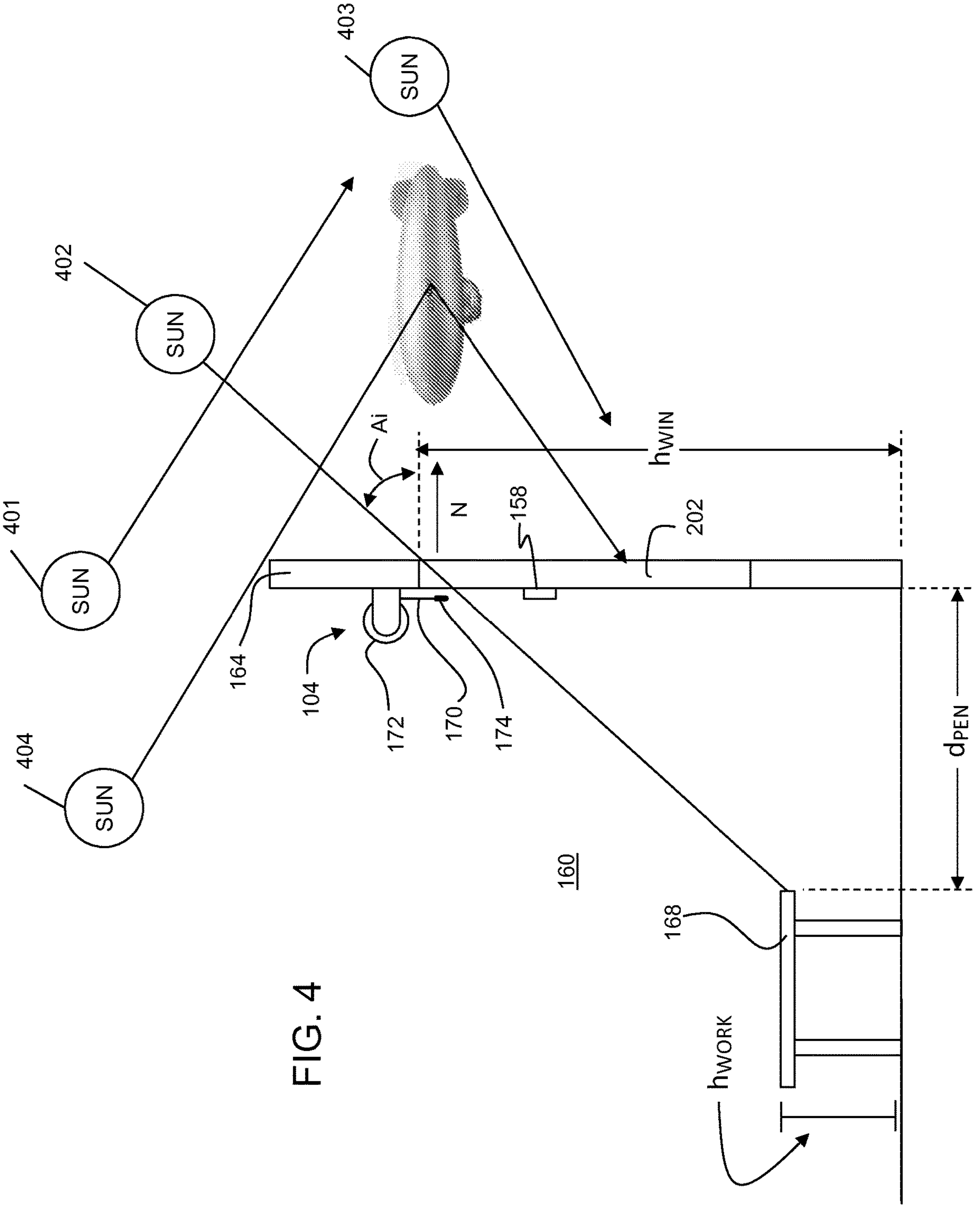
FIG. 4 is a diagram of different lighting conditions in which the system of FIG. 1A operates.

FIG. 4 shows different lighting conditions in which the system 100 can be operating. Most of the time, the sun is high in the sky (as shown by position 401, and user comfort can be provided by raising the shades to a "visor" position (FIG. 7B), which maintains a view while avoiding bright sky conditions for most users. The system is configured to allow the installer to set the visor position. Non-limiting example of visor positions can be from halfway open to two-thirds open.

Figures 7A, 7B, 7C, 7D:
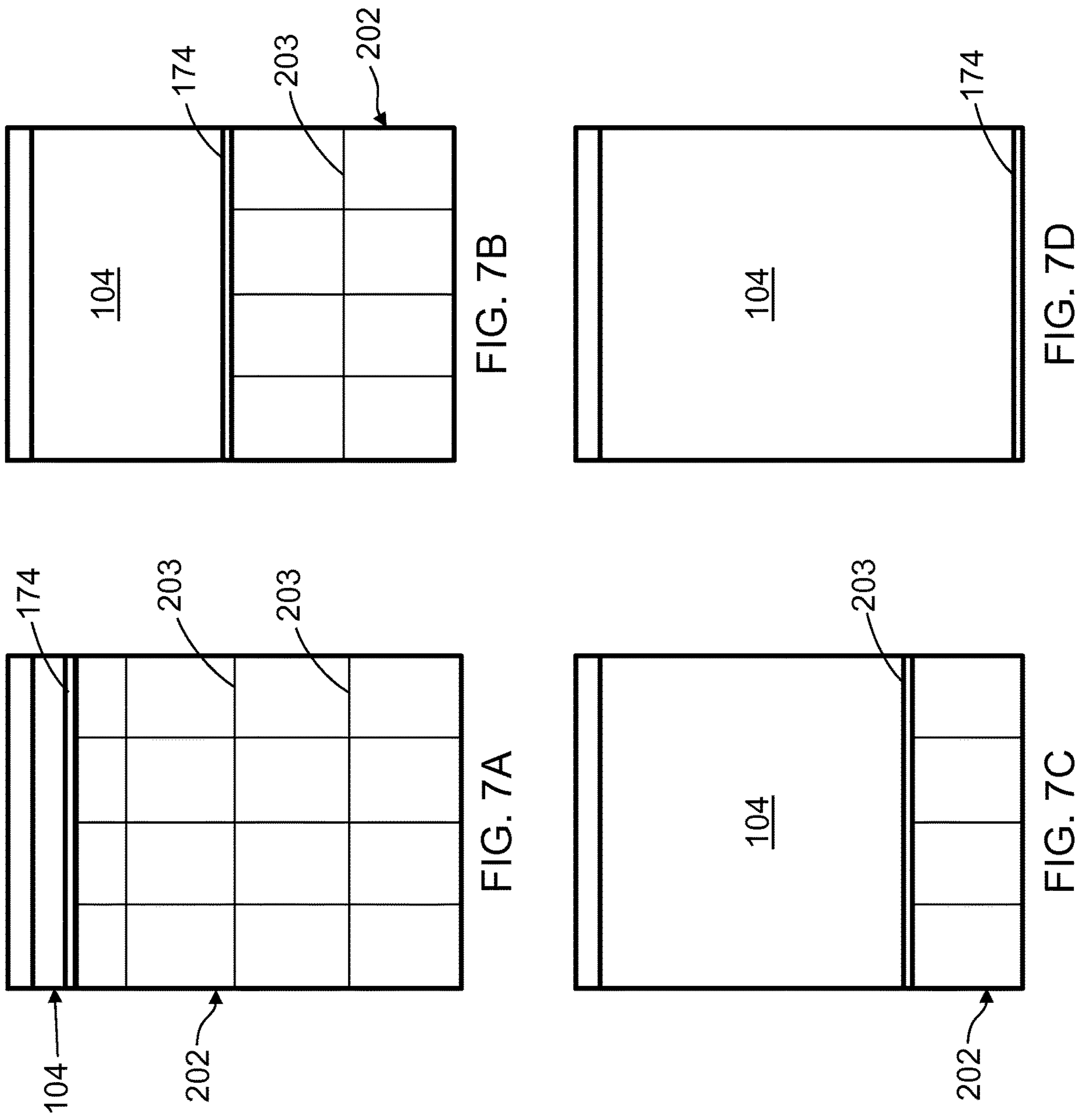
FIGS. 7A-7D shows shade positions corresponding to the operating modes of FIG. 6.

When the sun is lower in the sky, at shown by position 402 of FIG. 4, the system 100 partially closes the shades to limit the penetration distance $d_{PEN}$ of light into the room (FIGS. 4, 7C). Given the height $h_{WORK}$ of the task surface 168 and the height $h_{WIN}$ of the window 202, the system controller 110 computes the shade position to limit the penetration distance $d_{PEN}$ at any given time. As used herein, the "shade position to limit the penetration distance $d_{PEN}$" is the highest shade position (or most open position for other types of window treatments) that does not cause the penetration distance to exceed a predetermined threshold value.

On an unusually clear, bright day, with the sun at position 403 of FIG. 4, the direct sunlight can produce discomfort, even if the penetration distance is not very far into the room. This situation can occur when the exterior light level is at or above a predetermined bright threshold (e.g., 6,000 or 7,000 foot-candles). When the window sensor 158 detects that the light level exceeds the bright threshold, the system 100 moves the shades to a bright override position. In some embodiments, the bright override position is a completely closed position, as shown in FIG. 7D. In other embodiments, the bright override position is a mostly-closed position, which may be in between the positions shown in FIGS. 7C and 7D. For example, in some embodiments, the bright override position is about 90% closed. The bright override position is lower than the position for limiting the penetration distance $d_{PEN}$, and is the most closed position setting for the shade. In some installations, the bright override position is set to a completely closed position. In other installations (e.g., with long windows that extend near to the floor or completely to the floor), the bright override position can be a nearly closed position between the bottom of the window and the computed height for limiting the penetration distance $d_{PEN}$. The bright threshold can be set for a given installation according to general user preferences.

As shown by position 404 of FIG. 4, if the sun is behind the window (i.e., behind the building on which the window is located), there is no direct sunlight entering through the window. That is, there is no direct line of sight between the sun and the window. In this situation, the motorized roller shade 104 can be maintained in the visor position without any glare, until the light level falls off below a predetermined dark threshold (e.g., 500 foot-candles (FC)), at which time the shade can be completely opened or opened to a dark visor position which is the most open position of the motorized roller shade 104 (FIG. 7A).

When the sun angle of incidence Ai (i.e., the angle between direct sun's rays and a direction normal to the plane of the window 202) is at least 90 degrees (e.g., in position 404), there is no direct line of sight between the sun and the window. For a given latitude, date, and façade direction, the time of day when the sun angle of incidence reaches 90 degrees can readily be calculated. However, if the motorized roller shade 104 is opened to the visor position the entire time that Ai is at least 90 degrees, the room can be exposed to unexpected bright light due to reflected light from structures in the environment (e.g., buildings, specular surfaces on the ground, electric lights) or even unusually bright ambient conditions. The above-described computations based on latitude, date and façade direction do not account for the presence of any of these light sources. Nevertheless, the window sensor 158 does detect a change in the light level, as may occur when the sun's position changes and the sun's light bounces off an object into the room. Thus, the window sensor 158 can provide data that can serve as a substitute for information about these sources of reflected light.

In some embodiments, the system controller 110 is configured to select the bright threshold value from among at least two predetermined values. In some embodiments, the higher bright threshold (HBT) value (e.g., 6,000 to 7,000 foot-candles) corresponds to a very bright day, when direct sunlight or a combination of direct sun and reflected sun from a ground surface (such as snow cover or a body of water) is likely to annoy occupants, or interfere with work tasks (such as viewing a display device). The lower bright threshold (LBT) value (e.g., 2,500-3,000 foot-candles) corresponds to light levels that are higher than the expected light level corresponding to diffuse ground and atmospheric reflections when the sun is behind the building 200. Thus, in some embodiments, the bright threshold is set to the HBT value when the sun angle of incidence Ai is less than 90 degrees, and is set to the LBT value when the sun angle of incidence Ai is 90 degrees or greater. When there is no direct sunlight (e.g., the sun angle of incidence Ai is greater than or equal to 90 degrees), and the window sensor 158 detects a light level on the window greater than the LBT value, the system responds by moving the motorized roller shade 104 to the (closed) bright override position, just as when there is direct sunlight (e.g., the sun angle of incidence Ai is less than 90 degrees), and the window sensor 158 detects a light level on the window greater than the HBT value. The lower threshold of the LBT value accounts for the attenuation of the indirect sunlight as is partially reflected off of the ground, objects or other structures.

Figure 5:
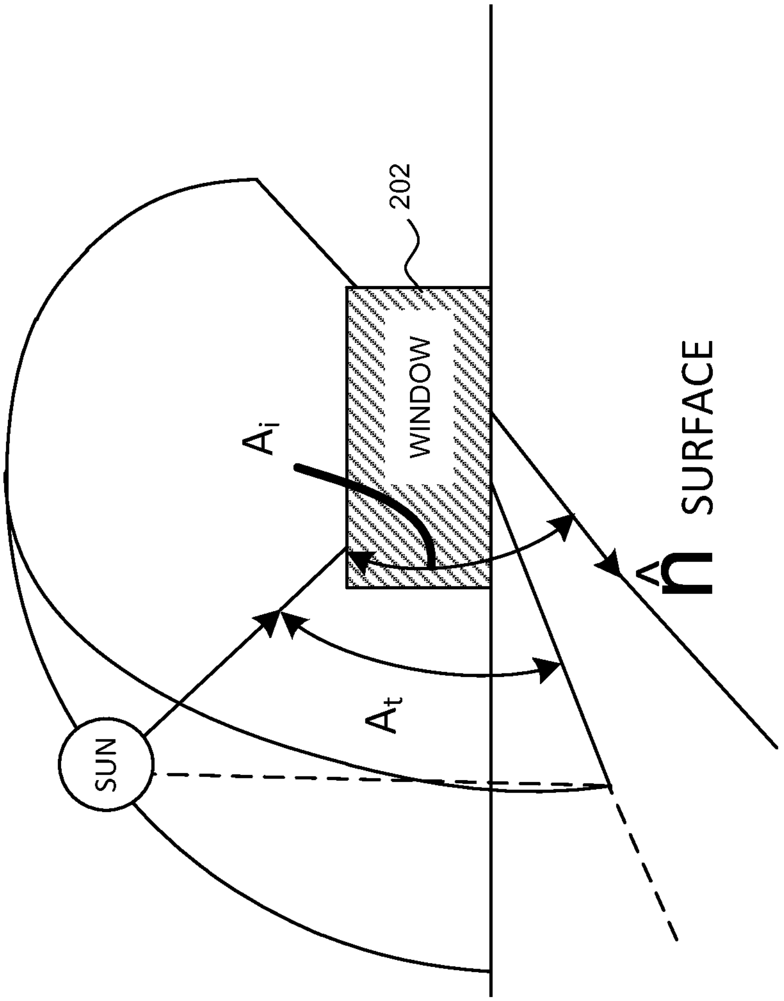
FIG. 5 is a diagram showing the relationships of window surface normal, sun angle of incidence and sun altitude angle.

The selection depends on the angle of incidence between light rays from the sun and a surface normal of the window. FIG. 5 shows the sun angle of incidence Ai.

Figure 6:
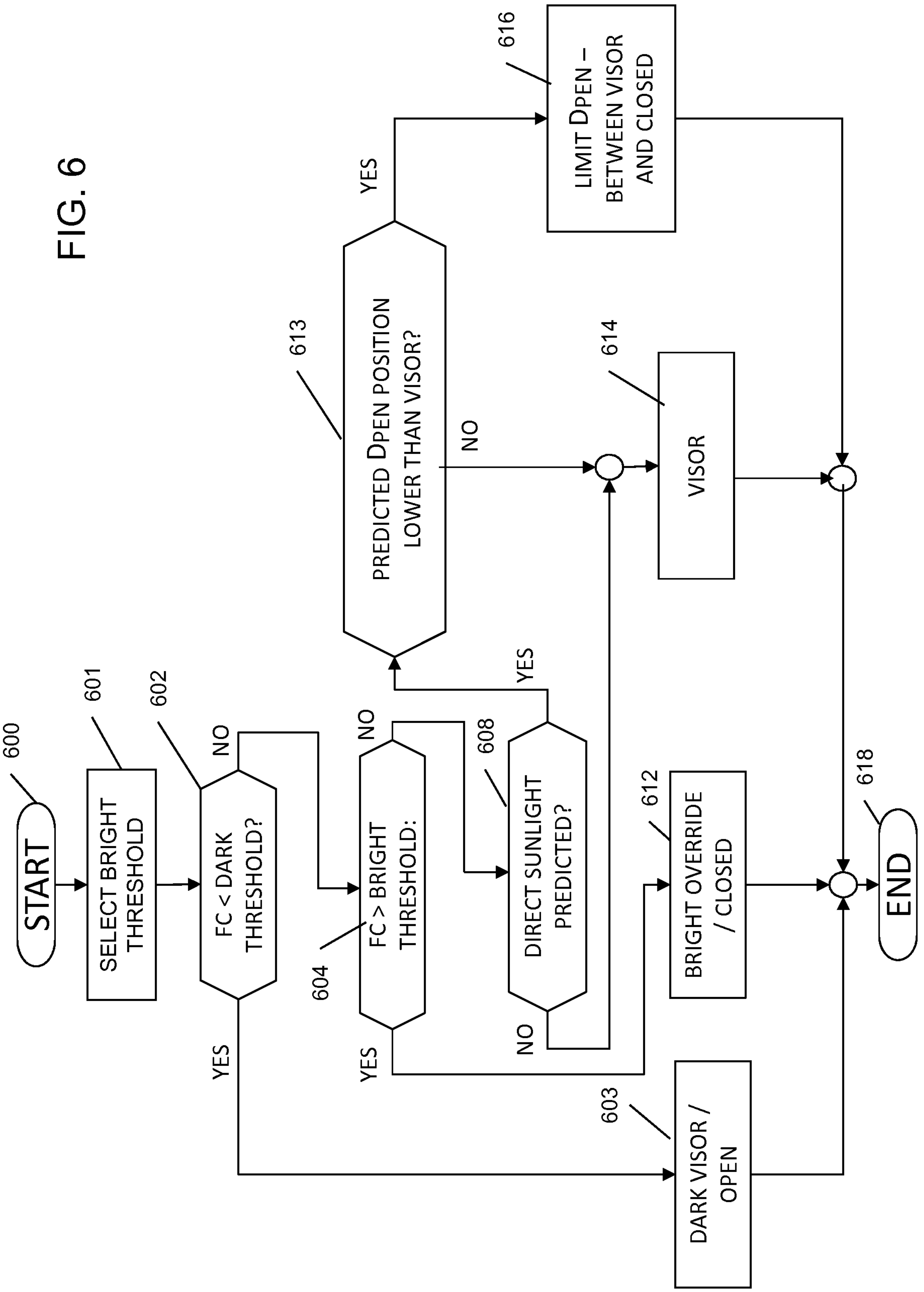
FIG. 6 is a flow chart of the system operation, including selection of operating modes.

FIG. 6 is a flow chart of an example control procedure showing the general operation of the system 100. The control procedure is performed periodically throughout the day (e.g., every 15 minutes, every half hour, or every hour).

At step 600, execution begins.

At step 601, the system controller 110 dynamically selects the bright threshold (either the LBT value or the HBT value), based on the current value of the sun angle of incidence Ai. The selection of one of the bright threshold values is explained below in the description of FIGS. 8A and 8B.

At step 602, the exterior light level at a given façade is measured, for example by the output of the window sensor 158. If a given façade has multiple floors and/or multiple groups per floor, the light level is measured individually for each group, on each floor, on each façade. The system controller 110 determines whether the measured light level in foot-candles is less than the dark threshold value (e.g., 500 foot-candles). If the light level is less than the dark threshold value, then step 603 is performed. Otherwise, step 604 is performed.

At step 603, when the measured light level in foot-candles is less than the dark threshold value, the system controller 110 issues a command to the control circuits 136 of the MDUs 130 to move the motorized roller shades 104 in the group to the dark visor position (FIG. 7A), which can be a fully open position.

At step 604, when the light level is greater than the dark threshold, the system controller 110 determines whether the light level is greater than the current value of the bright threshold, which at any given time, can either be the LBT (e.g., 2,500 foot candles) or the HBT (e.g., 6,000 foot candles). If the light level is greater the current bright threshold, step 612 is performed. Otherwise, step 608 is performed.

At step 608, when the light level is greater than the dark threshold but less than the bright threshold, the system controller 110 determines whether direct sunlight is predicted (i.e., when the sun angle of incidence Ai is less than 90 degrees). The system controller 110 computes the sun angle of incidence Ai based on latitude, date, time of day, and the direction N normal to the façade (i.e., normal to the plane of the window 202). This determination of whether there is direct sunlight is predictive, and does not account for weather, or for any objects or buildings blocking the field of view. If direct sunlight is predicted, step 613 is performed. Otherwise, step 614 is performed.

At step 612, when the light level is greater than the current bright threshold value (which can be the LBT or the HBT), the system controller 110 transmits a command to the control circuits 136 of the MDUs 130 to move the motorized roller shades 104 in the group to the bright override position, which can be a fully closed position or a near fully closed position (FIG. 7D).

At step 613, when the light level is greater than the dark threshold but less than the bright threshold, and direct sunlight is predicted (i.e., when the sun angle of incidence Ai is less than 90 degrees), the system controller 110 computes the shade position that will limit the penetration distance $d_{PEN}$ to the desired maximum penetration distance and determines whether the predicted position to limit $d_{PEN}$ to the desired maximum penetration distance is lower than the visor position. If the predicted position to limit $d_{PEN}$ to the desired maximum penetration distance is lower, then step 616 is performed. If the predicted position to limit $d_{PEN}$ to the desired maximum penetration distance is not lower (i.e., the visor position is lower or equal to the predicted position to limit $d_{PEN}$ to the desired maximum penetration distance), then step 614 is performed.

At step 614, when there is direct sunlight (sun angle of incidence is less than 90 degrees), and the light level is less than or equal to the current bright threshold value (which can be the LBT or the HBT), the system controller 110 transmits a command to the control circuits 136 of the MDUs 130 to move the motorized roller shades 104 in the group to the predetermined visor position (FIG. 7B), which can be between one half and two thirds open position, for example.

At step 616, when direct sunlight is predicted (i.e., when the sun angle of incidence Ai is less than 90 degrees), and the predicted position to limit the penetration distance $d_{PEN}$ to the desired maximum penetration distance is lower than the bright visor position, then the system controller 110 transmits a command to the control circuits 136 of the MDUs 130 to move the motorized roller shades 104 in the group to the position to limit the penetration distance $d_{PEN}$ to the desired maximum penetration distance (FIG. 7C).

At step 618, the control procedure concludes.

FIGS. 7A to 7D show the relationship of the various predetermined and computed shade positions. In FIGS. 7A-7D, a window 202 has a motorized roller shade 104 with a hem bar 174. The window 202 is shown with muntins 203 for ease of illustration, but muntins are not required. If muntins are present, the predetermined positions can optionally align with the muntins, but the positions do not have to be aligned with muntins.

FIG. 7A shows the motorized roller shade 104 in the dark visor position, which is the most open position in the range of motion of the motorized roller shade 104.

FIG. 7B shows the motorized roller shade 104 in the visor position, which is chosen to maintain occupant view, but limit bright day light level to a level that is satisfactory for most users.

FIG. 7C shows the motorized roller shade 104 in a position to limit the penetration distance $d_{PEN}$ to the desired maximum penetration distance. This position is computed periodically throughout the day, and is generally higher when the sun angle of incidence Ai is greater, and lower when the sun angle of incidence Ai is small.

FIG. 7D shows the motorized roller shade 104 in the bright override position, which is the most closed position of the shade within the range of the shade's operation.

Figure 8:
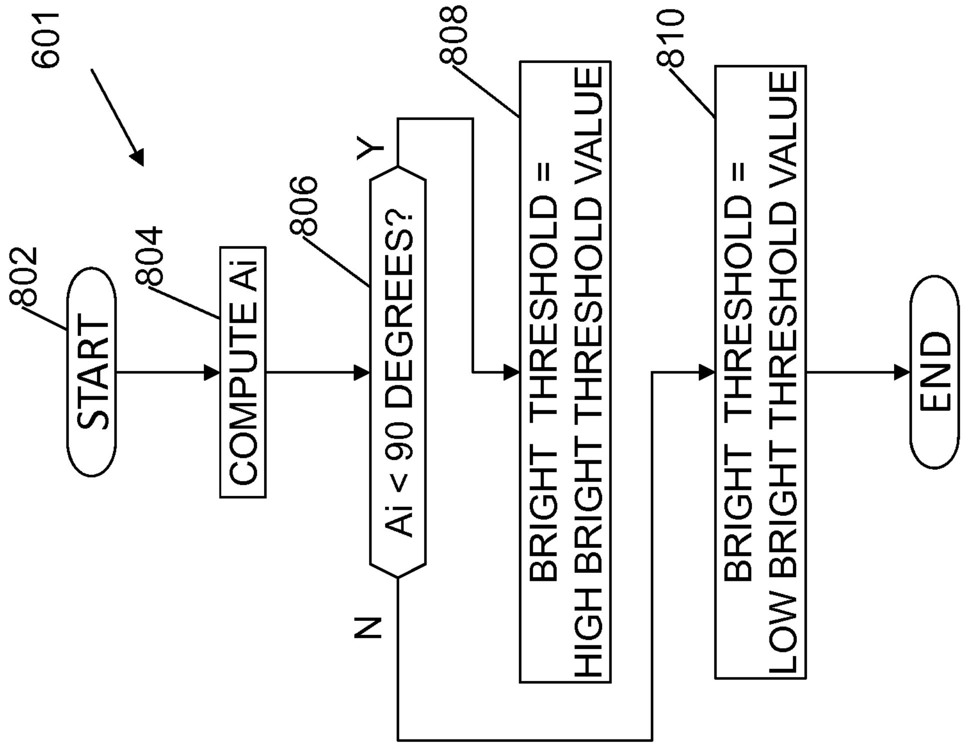
FIG. 8 is a flow chart of an embodiment of a method for selecting the bright threshold value of FIG. 6.

FIG. 8 is a flow chart of one embodiment of a bright threshold selection procedure that may be executed at step 601 for selecting the bright threshold.

At step 802, execution begins.

At step 804, the system controller 110 computes the sun angle of incidence Ai, based on latitude, date, time of day, and façade direction.

At step 806, the system controller 110 determines whether the sun angle of incidence Ai is less than 90 degrees. If the sun angle of incidence Ai is less than 90 degrees, step 808 is performed. Otherwise, step 810 is performed.

At step 808, when the angle of incidence Ai is less than 90 degrees (i.e., when there is direct sunlight on the façade), the bright threshold is set to the HBT value.

At step 810, when the sun angle of incidence Ai is greater than or equal to 90 degrees (i.e., when there is no direct sunlight on the façade, such as when the sun is behind the building), the bright threshold is set to the LBT value.

The bright threshold selection procedure then ends.

In some embodiment, the bright override position is varied. The bright override position can be varied in combination with varying the bright threshold as described herein. In some embodiments, the shades are closed in the bright override position when the sun is on the façade (Ai<90 degrees), but the bright override position is a nearly-closed position (e.g., 90% closed) when the sun is behind the façade (Ai>90 degrees).

In some embodiments, the bright override position is a continuous variable dependent on the incident angle. This capability can respond to reflections off a neighboring building or other reflective surface. Given the sun incidence angle, the system controller 110 can compute the likely sun penetration angle from the reflection and (rather than moving the shades completely closed) move the shades to a bright override position where the penetration of the reflected sunlight is not greater than the user's desired maximum penetration distance. Such embodiments can control depth of penetration for facades receiving reflected light from a building, for example.

In some embodiments, the bright override position is computed as a continuous variable for facades which are not in direct sun. In some embodiments, the position is determined by computing an equivalent position of a shade to control depth of penetration on a façade receiving direct sunlight and facing 180 degrees from the façade receiving the reflection. The calculation of position for controlling depth of penetration in a window receiving direct sunlight can use the method described in U.S. Pat. No. 8,288,981. The system then automatically moves the shade of the window on the façade receiving the reflection to that equivalent position.

In some embodiments, on a bright day, when the sun angle of incidence Ai approaches 90 degrees, the measured light level (from sensor 158) may be in between the LBT and HBT values. Thus, because there is still direct sunlight, but the light level is below the HBT value, the shade would be in the visor position. If the bright threshold value is changed from the HBT value to the LBT value at the moment when the sun angle of incidence Ai reaches 90 degrees, the occupant would observe the exterior light level decrease slightly, and the shade closing (because the light level is still above the LBT value.

Figure 9:
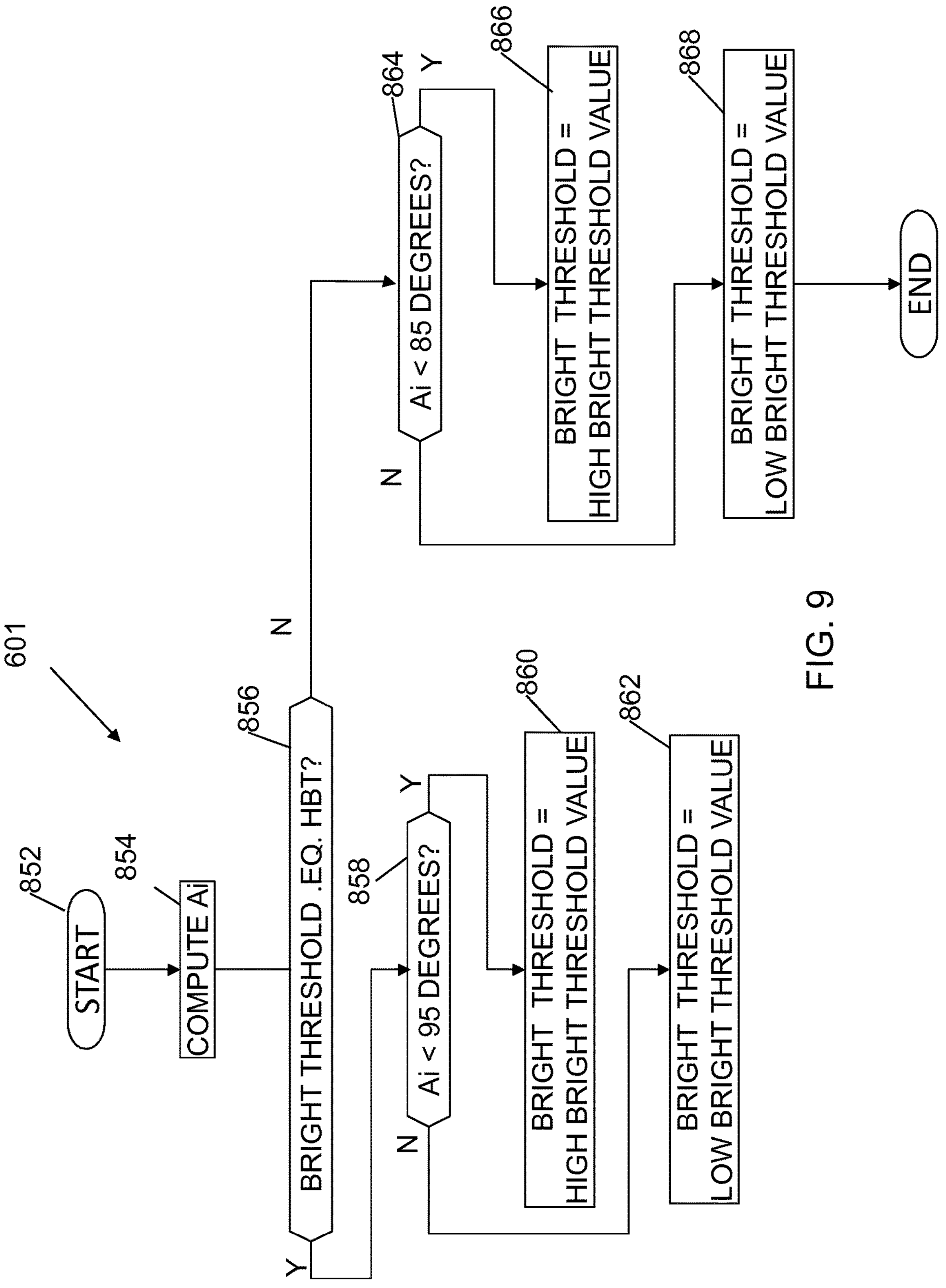
FIG. 9 is a flow chart of a variation of the method of FIG. 8 for selecting the bright threshold value of FIG. 6.

In some embodiments, as shown in FIG. 9, this set of lighting conditions is accommodated by varying the angle at which the bright threshold value transitions between the LBT and the HBT. If the sun is heading behind the building, the transition (from HBT to LBT) is delayed until the sun angle of incidence Ai is a predetermined value greater than 90 degrees, so that the shade does not close as soon as the direct sunlight ends.

On the other hand, when the sun is emerging from behind the building, the current value of the bright threshold is the LBT value. If the window sensor 158 detects a very bright light level (e.g., due to light bouncing off an object or surface), greater than the LBT value, the shade is currently closed. At the moment when the sun emerges from behind the building, and the light level starts to increase, the transition (from LBT to HBT) is delayed until the sun angle of incidence Ai is a predetermined value less than 90 degrees, so that the shade does not open as soon as the direct sunlight starts. As the sun becomes lower in the sky, the light level increases, and may reach the HBT value. Thus, delaying the transition of the bright threshold from the LBT value to the HBT value can prevent the system 100 from opening the motorized roller shade 104 while the light level approaches the HBT value.

Referring now to FIG. 9, an alternative embodiment of a bright threshold selection procedure that may be executed at step 601 of FIG. 6 is provided.

At step 852, the process starts.

At step 854, the system controller 110 computes the sun angle of incidence Ai.

At step 856, the system controller 110 determines whether the current bright threshold value is equal to the HBT value. When the bright threshold value equals the HBT value, the sun's position is moving from a position in front of the building towards a position behind the building. When the bright threshold value equals the LBT value, the sun's position is moving from a position behind the building towards a position in front of the building. If the bright threshold value is currently equal to the HBT value, step 858 is performed. Otherwise, step 864 is performed.

At step 858, the system controller 110 determines whether the sun angle of incidence Ai is less than 95 degrees (i.e., the sun is in front of the window, or less than 5 degrees behind the window). If the sun angle of incidence Ai is less than 95 degrees, step 860 is performed. If the sun angle of incidence Ai is greater than or equal to 95 degrees, step 862 is performed.

At step 860, the bright threshold value remains at the HBT value.

At step 862, the bright threshold value is set to the LBT value.

At step 864, when the bright threshold value is currently the LBT value, a determination is made whether the sun angle of incidence Ai is less than 85 degrees. The 85 degree threshold corresponds to a predetermined period after the sun emerges from behind the building. If the sun angle of incidence Ai is less than 85 degrees, step 866 is performed. Otherwise, step 868 is performed.

At step 866, the bright threshold value is set to the HBT value.

At step 868, the bright threshold value remains at the LBT value.

Although the example in FIG. 9 uses the angles of 95 degrees and 85 degrees as the dividing point between using the LBT and the HBT as the bright threshold, one of ordinary skill can select other values (e.g., 96 degrees and 84 degrees, 97 degrees and 83 degrees, etc.) to delay the transition until the light level is closer to or reaches the new threshold value.

In other embodiments, the bright threshold value can be calculated by a function, to smoothly transition the bright threshold level. Referring again to FIG. 5, a function for computing the bright override value can be based on two variables: the sun angle of incidence Ai, and the altitude angle of the sun At, wherein At is the angle between the sun's rays and a line of sight from the window to the horizon (at the point on the horizon directly beneath the sun).

In some embodiments, the system controller 110 or the control circuit 136 dynamically calculates the bright threshold value as a function of the altitude angle and the incident angle. That is, for a given façade, a different value of the bright threshold can be calculated at any time of the day.

In one embodiment, the system controller 110 dynamically calculates the bright threshold value according to equations as a function of altitude and incident angles. An example set of equations of how this could be done is the following:

$$Emax=(Esun/0.8)*Calt*Cinc.$$

where: Emax is the computed bright threshold value;
Esun is a predetermined maximum bright threshold value;
Calt is a function of the altitude angle of the sun; and
Cinc is a function of the incident angle of the sun.
wherein Calt is given by the equation:

$$Calt=1-0.75*[1-\exp(-0.21/\sin At)/0.81],$$

where At is the altitude angle of the sun.
and Cinc is given by the equation:

$$Cinc=[1-\cos Ai]*[1-Eshade/Esun]$$

where Ai is the incident angle of the sun; and
Eshade is a predetermined minimum bright threshold value.

For example, the value of Esun can be about 6,000 foot-candles, and the value of Eshade can be set to about 2,500. Using these two values, the above equations yield an Emax value of 6,000 when the normal to the window is pointing directly at the sun, and a value of 2,500 when the sun angle of incidence Ai is 90 degrees.

Figure 10:
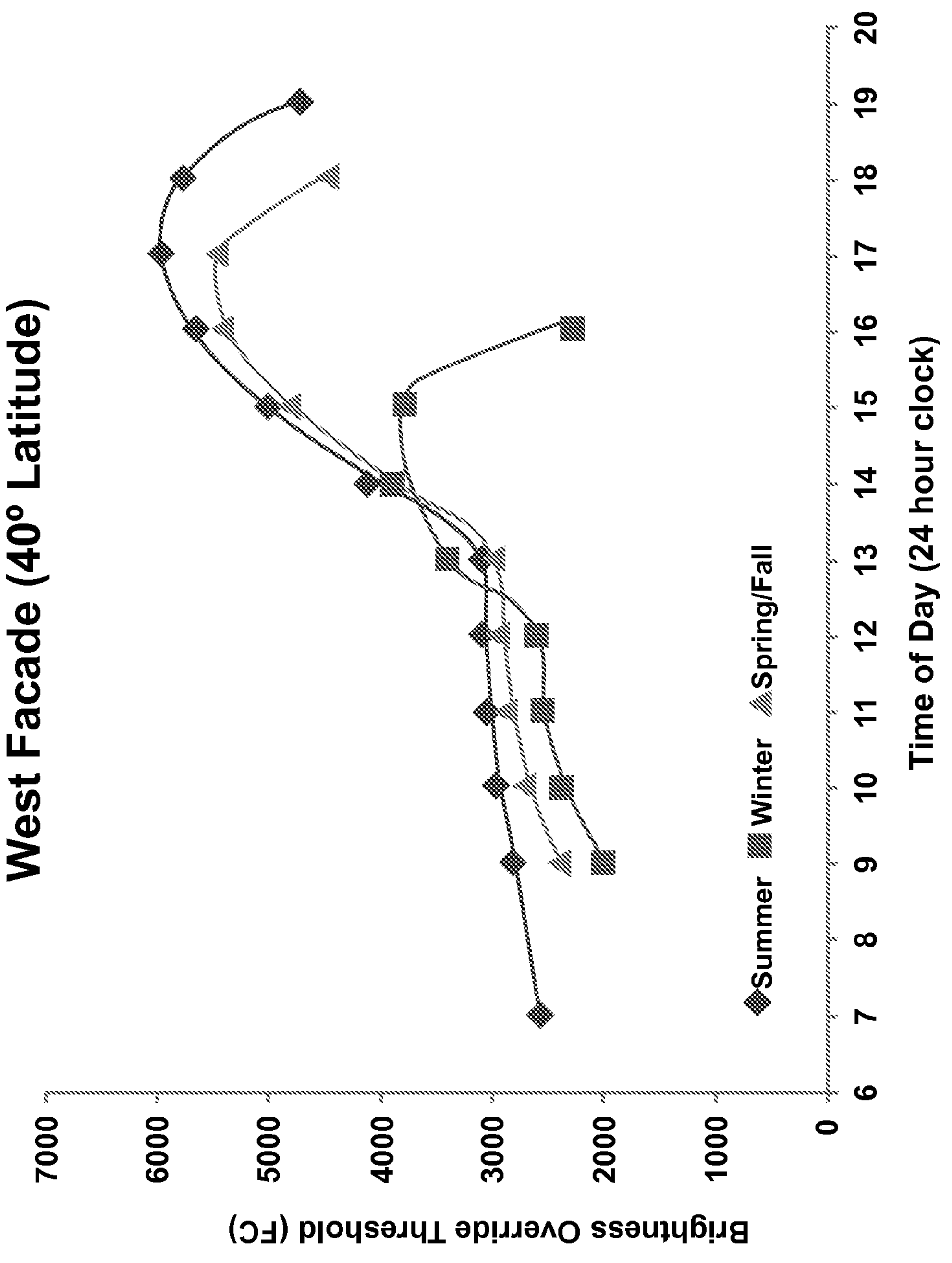
FIG. 10 is an example of a set of calculated bright threshold values for different dates and time of day.

FIG. 10 shows an example of the computed threshold Emax for a west-facing façade of a building at 40 degrees latitude based on the example equations shown above. The values vary by time of day and by date. Examples are shown for a day in the summer, winter and spring. In each case, the value is closer to the value of Eshade in the morning, when the sun is behind the building, and throughout the day in the winter. The computed threshold Emax is closer to Esun in the afternoon in fall, spring and summer, when the sun is in front of the window.

Figure 11:
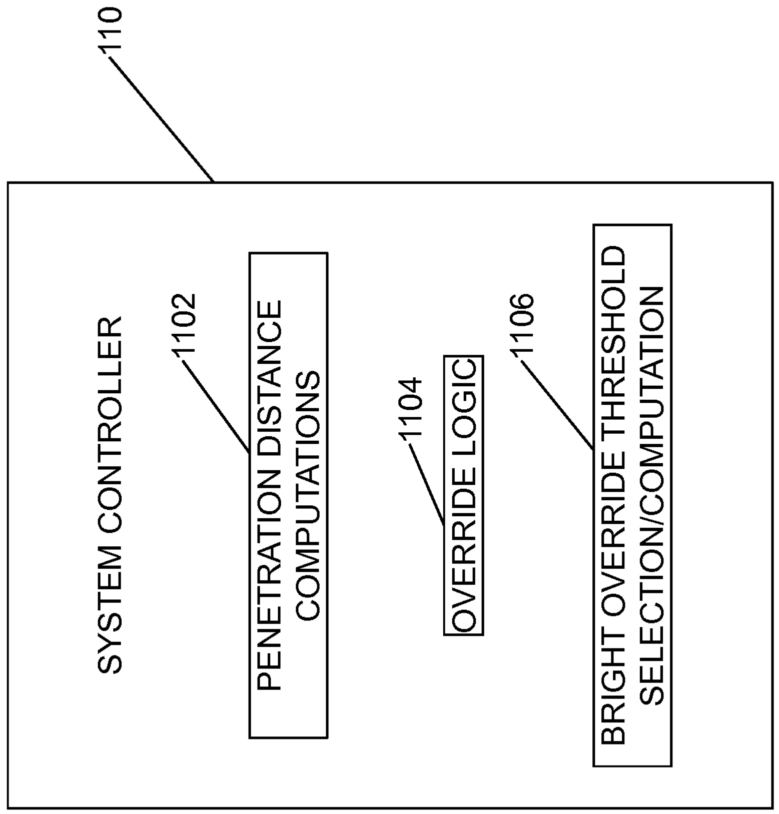
FIG. 11 is a block diagram showing a system controller configured to execute the operation mode logic.

In the examples described above, a particular allocation of tasks to processors is described. Thus, as shown in FIG. 11, the system controller 110 includes a first module 1102 for computing the shade positions to limit sunlight penetration distance, a second module 1104 containing the override logic of FIG. 6, and a third module 1106 for bright threshold selection as described in FIGS. 8 and 9 or bright threshold computation. The calculation of shade position to limit sunlight penetration distance is performed in the system controller 110. The operating mode selection and override logic of FIG. 6 is also performed in the system controller 110. The system controller 110 transmits shade group level commands to the MDUs 130. Thus, the system controller 110 acts as a central controller and performs the calculations that are shared among multiple shades or shade groups on the same facade. In some embodiments, the control circuit 136 of each MDU 130 handles any calculations that are specific to a type of shade. For example, the control circuit 136 is configured to receive a command to move the shade hem bar to a specific position. The control circuit 136 includes a processor, instruction storage, data storage, and memory for computing the number of rotations of the roller to achieve a desired extension or retraction of the shade fabric.

In some embodiments a floor of a building may be set up with multiple system controller 110, for matters of administrative efficiency, or to permit a larger number of devices on the floor to be controlled. In some embodiments, one of the system controllers 110 on the floor is designated to operate as a master controller. The master controller contains the first module 1102 for computing the shade positions to limit sunlight penetration distance, the second module 1104 containing the override logic, and the third module 1106 for bright threshold selection or bright threshold computation. The other one or more system controllers 110 (designated "sub" controller) contain the second module 1104 containing the override logic, and the third module 1106 for bright threshold selection or bright threshold computation. These sub controllers receive the penetration distance computations from the master controller.

Figure 12:
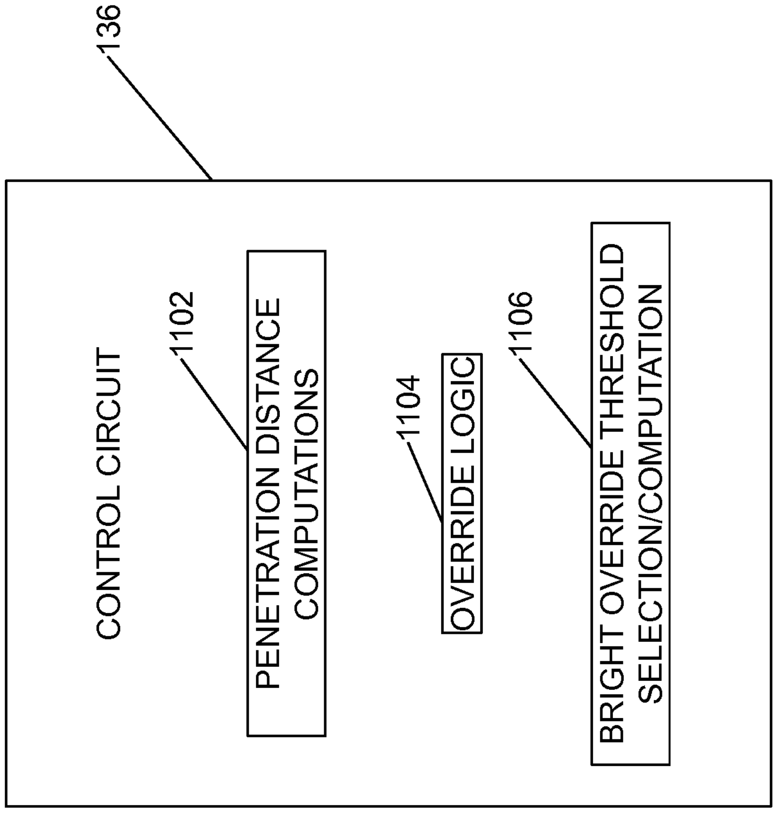
FIG. 12 is a block diagram of a control circuit configured to execute the operation mode logic.

In other embodiments, the control circuit 136 further includes instruction and processing capacity to perform the above functions. Thus, as shown in FIG. 12, the control circuit 136 includes the first module 1102 for computing the shade positions to limit sunlight penetration distance, the second module 1104 containing the override logic of FIG. 6, and the third module 1106 for bright threshold selection as described in FIGS. 8 and 9 or bright threshold computation.

Figure 13:
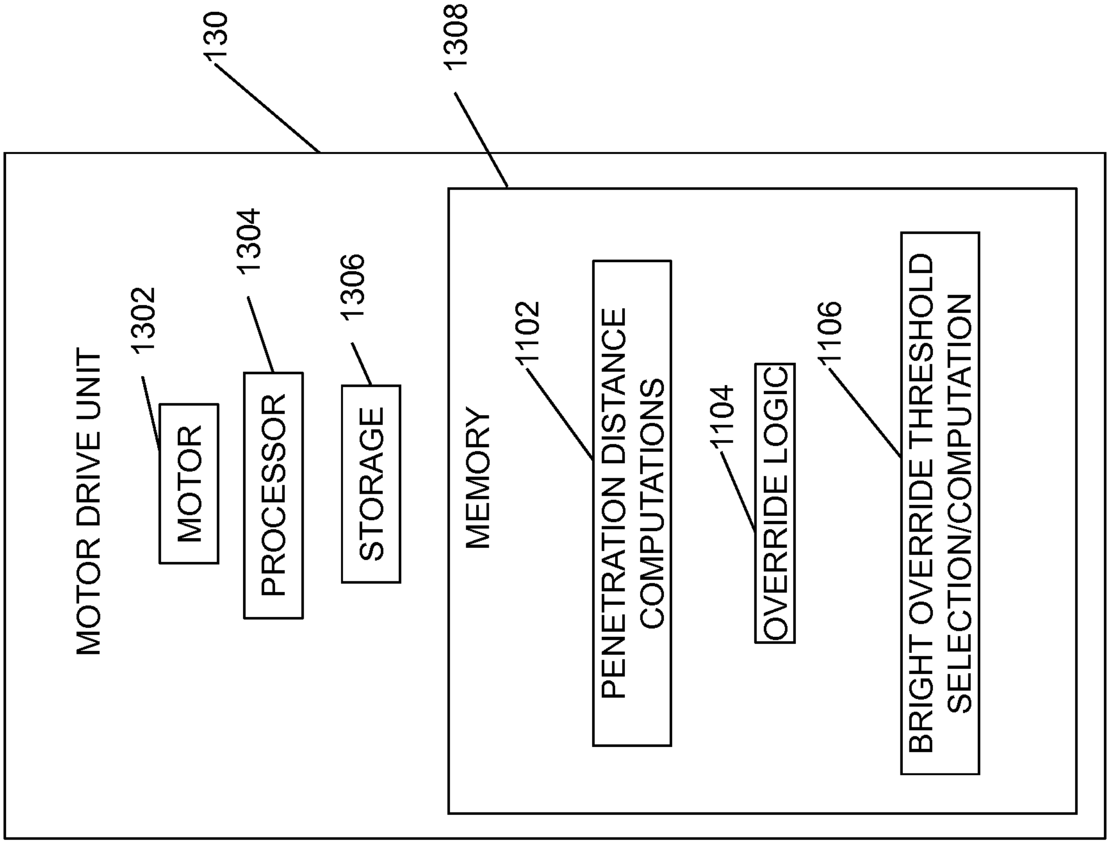
FIG. 13 is a block diagram showing a motor drive unit configured to execute the operation mode logic.
Figure 14:
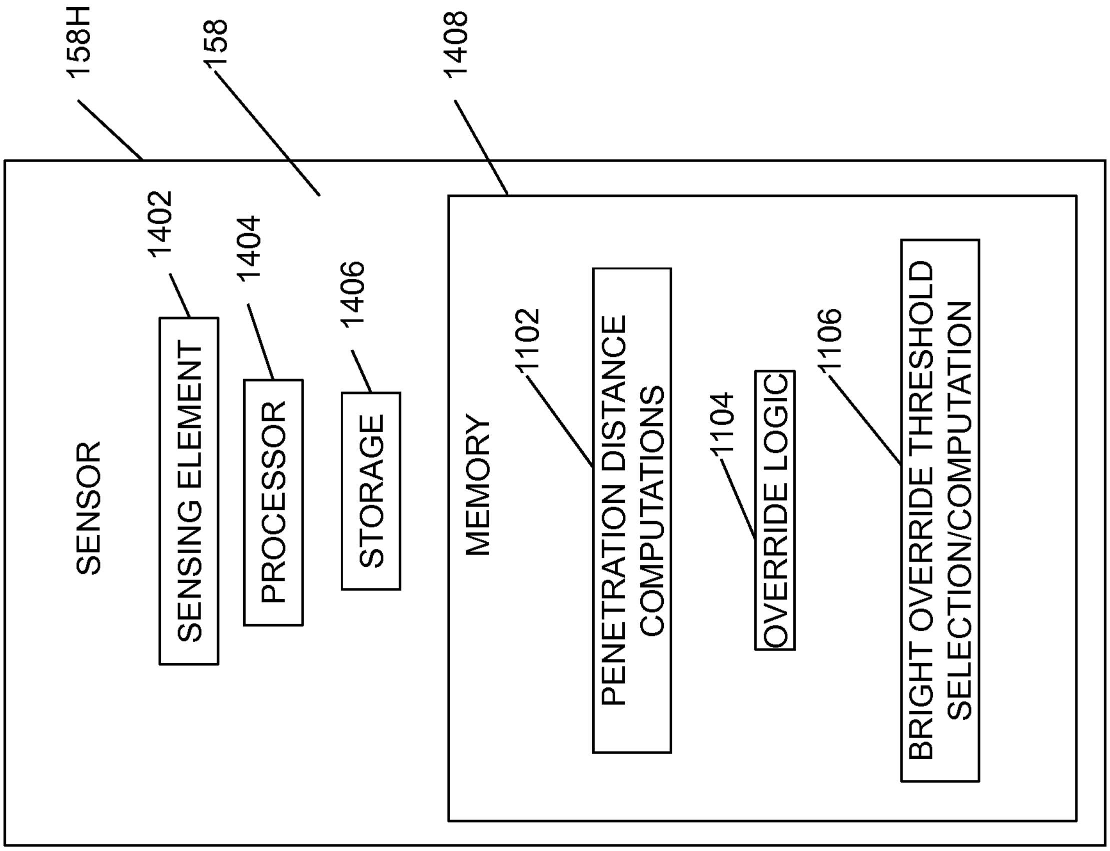
FIG. 14 is a block diagram showing a sensor configured to execute the operation mode logic.

In other embodiments, the same functions can be included within a housing of the motor drive unit 130. Each MDU 130 includes a motor 1302, a processor 1304, instruction and data storage 1306, and memory 1308 for computing the number of rotations of the roller to achieve a desired extension or retraction of the shade fabric. Additionally, as shown in FIG. 13, the MDU 130 includes the first module 1102 for computing the shade positions to limit sunlight penetration distance, the second module 1104 containing the override logic, and the third module 1106 for bright threshold selection or bright threshold computation.

In other embodiments, the sensor 158 has a housing 158H, and the control functions are contained within the housing of the sensor. The sensor 158 includes a sensing element 1402, a processor 1404, instruction and data storage 1406, and memory 1408 for processing the sensor voltage signals to provide light level information. Additionally, as shown in FIG. 13, the sensor 158 includes the first module 1102 for computing the shade positions to limit sunlight penetration distance, the second module 1104 containing the override logic, and the third module 1106 for bright threshold selection or bright threshold computation.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A motorized window treatment positioning controller, comprising:

motorized window treatment control circuitry configured to:

receive, from a window sensor, a signal that includes data indicative of an intensity of light incident on a window;

retrieve, from operatively coupled memory circuitry, data representative of a high bright threshold value and a low bright threshold value; and on a daily basis, at each of a plurality of times:

determine a position of the sun with respect to the window;

determine whether the position of the sun results in sunlight directly incident on the window;

responsive to the determination that the position of the sun results in sunlight directly incident on the window:

determine whether the signal from the window sensor includes data indicative of an intensity of light incident on the window that exceeds the high bright threshold value; and position a window treatment in a bright override position responsive to the determination that the intensity of light incident on the window exceeds the high bright threshold value; or responsive to the determination that the position of the sun does not result in sunlight directly incident on the window:

determine whether the signal from the window sensor includes data indicative of an intensity of light incident on the window that exceeds the low bright threshold value; and position the window treatment in a bright override position responsive to the determination that the intensity of light incident on the window exceeds the low bright threshold value.

2. The motorized window treatment positioning controller of claim 1, the motorized window treatment control circuitry configured to:

retrieve, from the operatively coupled memory circuitry, data representative of a maximum sunlight penetration distance;

on a daily basis at each of the plurality of times:

calculate a position of the motorized window treatment based on a determined position of the sun with respect to the window such that a calculated position of the motorized window treatment limits a sunlight penetration distance to less than or equal to the maximum sunlight penetration distance; and cause the motorized window treatment to transition to the calculated position.

3. The motorized window treatment positioning controller of claim 1, wherein to determine the position of the sun with respect to the window, the motorized window treatment control circuitry is configured to:

calculate, using an algorithm, the position of the sun with respect to the window based on a date, a facing, and a geolocation of the window.

4. The motorized window treatment positioning controller of claim 1, the motorized window treatment control circuitry configured to:

retrieve, from the operatively coupled memory circuitry, data representative of a dark threshold value;

determine whether the signal from the window sensor that includes data indicative of an intensity of light incident on the window is below the dark threshold value; and position the window treatment in a dark override position responsive to the determination that the intensity of light incident on the window is below the dark threshold value.

5. The motorized window treatment positioning controller of claim 1 wherein to calculate the position of the motorized window treatment based on the determined position of the sun with respect to the window on a daily basis at each of the plurality of times, the motorized window treatment control circuitry is configured to, on a daily basis:

determine an astronomical sunrise time and an astronomical sunset time; and calculate, at periodic intervals between the determined astronomical sunrise time and the determined astronomical sunset time, the position of the motorized window treatment based on the determined position of the sun with respect to the window.

6. The motorized window treatment positioning controller of claim 5 wherein to determine the astronomical sunrise time and the astronomical sunset time, the motorized window treatment control circuitry is configured to:

retrieve, from the operatively coupled memory circuitry, data indicative of the astronomical sunrise time and the astronomical sunset time.

7. The motorized window treatment positioning controller of claim 5 wherein to determine the astronomical sunrise time and the astronomical sunset time, the motorized window treatment control circuitry is configured to:

calculate the astronomical sunrise time and the astronomical sunset time based on a date and a geolocation of the window.

8. A motorized window treatment positioning method, comprising:

receiving, from a window sensor by motorized window treatment control circuitry, a signal that includes data indicative of an intensity of light incident on a window;

retrieving, by the motorized window treatment control circuitry from operatively coupled memory circuitry, data representative of a high bright threshold value and a low bright threshold value; and determining, by the motorized window treatment control circuitry on a daily basis at each of a plurality of times, a position of the sun with respect to the window;

determining, by the motorized window treatment control circuitry on a daily basis at each of a plurality of times, whether the position of the sun results in sunlight directly incident on the window;

determining, by the motorized window treatment control circuitry in response to determining that the position of the sun results in sunlight directly incident on the window, whether the signal from the window sensor includes data indicative of an intensity of light incident on the window that exceeds the high bright threshold value; and positioning, by the motorized window treatment control circuitry, a window treatment in a bright override position responsive to determining that the intensity of light incident on the window exceeds the high bright threshold value; or determining, by the motorized window treatment control circuitry in response to determining that the position of the sun does not result in sunlight directly incident on the window, whether the signal from the window sensor includes data indicative of an intensity of light incident on the window that exceeds the low bright threshold value; and positioning, by the motorized window treatment control circuitry, the window treatment in a bright override position in response to determining that the intensity of light incident on the window exceeds the low bright threshold value.

9. The method of claim 8, further comprising:

retrieving, by the motorized window treatment control circuitry from the operatively coupled memory circuitry, data representative of a maximum sunlight penetration distance;

calculating, by the motorized window treatment control circuitry on a daily basis at each of the plurality of times, a position of the motorized window treatment based on the determined position of the sun with respect to the window such that the calculated position of the motorized window treatment limits a sunlight penetration distance to less than or equal to the maximum sunlight penetration distance; and causing, by the motorized window treatment control circuitry, the motorized window treatment to transition to the calculated position.

10. The method of claim 8, wherein determining the position of the sun with respect to the window comprises:

calculating, by the motorized window treatment control circuitry, the position of the sun with respect to the window using an algorithm based on a date, a facing, and a geolocation of the window.

11. The method of claim 8, further comprising:

retrieving, by the motorized window treatment control circuitry, data representative of a dark threshold value from the operatively coupled memory circuitry;

determining, by the motorized window treatment control circuitry, whether the signal from the window sensor includes data indicative of an intensity of light incident on the window that is below the dark threshold value; and positioning, by the motorized window treatment control circuitry, the window treatment in a dark override position responsive to determining that the intensity of light incident on the window is below the dark threshold value.

12. The method of claim 8 wherein calculating the position of the motorized window treatment based on the determined position of the sun with respect to the window at each of the plurality of times comprises, on a daily basis:

determining, by the motorized window treatment control circuitry, an astronomical sunrise time and an astronomical sunset time; and calculating, by the motorized window treatment control circuitry, the position of the motorized window treatment based on a determined position of the sun with respect to the window at periodic intervals between the determined astronomical sunrise time and the determined astronomical sunset time.

13. The method of claim 12 wherein determining the astronomical sunrise time and the astronomical sunset time comprises:

retrieving, by the motorized window treatment control circuitry, data indicative of the astronomical sunrise time and the astronomical sunset time from the operatively coupled memory circuitry.

14. The method of claim 12 wherein determining the astronomical sunrise time and the astronomical sunset time comprises:

calculating, by the motorized window treatment control circuitry, the astronomical sunrise time and the astronomical sunset time based on a date and a geolocation of the window.

15. A non-transitory, machine-readable, storage device that includes instructions that, when executed by motorized window treatment control circuitry, cause the motorized window treatment control circuitry to:

receive, from a window sensor, a signal that includes data indicative of an intensity of light incident on a window;

retrieve, from operatively coupled memory circuitry, data representative of a high bright threshold value and a low bright threshold value; and on a daily basis, at each of a plurality of times:

determine a position of the sun with respect to the window;

determine whether the position of the sun results in sunlight directly incident on the window;

responsive to the determination that the position of the sun results in sunlight directly incident on the window:

determine whether the signal from the window sensor includes data indicative of an intensity of light incident on the window that exceeds the high bright threshold value; and position the window treatment in a bright override position responsive to the determination that the intensity of light incident on the window exceeds the high bright threshold value; or responsive to the determination that the position of the sun does not result in sunlight directly incident on the window:

determine whether the signal from the window sensor includes data indicative of an intensity of light incident on the window that exceeds the low bright threshold value; and position the window treatment in a bright override position responsive to the determination that the intensity of light incident on the window exceeds the low bright threshold value.

16. The non-transitory, machine-readable, storage device of claim 15 wherein the instructions, when executed by the motorized window treatment control circuitry, cause the motorized window treatment control circuitry to:

Retrieve, from the operatively coupled memory circuitry, data representative of a maximum sunlight penetration distance;

on a daily basis, at each of the plurality of times:

calculate a position of the motorized window treatment based on a determined position of the sun with respect to the window such that a calculated position of the motorized window treatment limits a sunlight penetration distance to less than or equal to the maximum sunlight penetration distance; and cause the motorized window treatment to transition to the calculated position.

17. The non-transitory, machine-readable, storage device of claim 15 wherein the instructions that cause the motorized window treatment control circuitry to determine the position of the sun with respect to the window cause the motorized window treatment control circuitry to:

calculate the position of the sun with respect to the window using an algorithm based on a date, a facing, and a geolocation of the window.

18. The non-transitory, machine-readable, storage device of claim 15 wherein the instructions, when executed by the motorized window treatment control circuitry, cause the motorized window treatment control circuitry to:

retrieve, from the operatively coupled memory circuitry, data representative of a dark threshold value;

determine whether the signal from the window sensor includes data indicative of an intensity of light incident on the window that is below the dark threshold value; and position the window treatment in a dark override position responsive to the determination that the intensity of light incident on the window is below the dark threshold value.

19. The non-transitory, machine-readable, storage device of claim 15 wherein the instructions that cause the motorized window treatment control circuitry to calculate the position of the motorized window treatment cause the motorized window treatment control circuitry to, on a daily basis:

determine an astronomical sunrise time and an astronomical sunset time; and calculate, at periodic intervals between the determined astronomical sunrise time and the determined astronomical sunset time, the position of the motorized window treatment based on the determined position of the sun with respect to the window.

20. The non-transitory, machine-readable, storage device of claim 19 wherein the instructions that cause the motorized window treatment control circuitry to determine the astronomical sunrise time and the astronomical sunset time cause the motorized window treatment control circuitry to:

retrieve, from the operatively coupled memory circuitry, data indicative of the astronomical sunrise time and the astronomical sunset time.

21. The non-transitory, machine-readable, storage device of claim 19 wherein the instructions that cause the motorized window treatment control circuitry to determine the astronomical sunrise time and the astronomical sunset time cause the motorized window treatment control circuitry to:

calculate the astronomical sunrise time and the astronomical sunset time based on a date and a geolocation of the window.

* * * * *